United States Patent [19]

Ueno et al.

[11] Patent Number: 4,732,003
[45] Date of Patent: Mar. 22, 1988

[54] METHOD OF CONTROLLING SUPERCHARGING PRESSURE IN TURBOCHARGER AND APPARATUS FOR SAME

[75] Inventors: Takashi Ueno, Yokosuka; Toshimi Abo, Yokohama; Katsunori Miyamura, Yokosuka, all of Japan

[73] Assignee: Nissan Motor Co., Ltd., Kanagawa, Japan

[21] Appl. No.: 807,225

[22] Filed: Dec. 10, 1985

[30] Foreign Application Priority Data

Dec. 11, 1984 [JP] Japan ............................... 59-261416
Dec. 11, 1984 [JP] Japan ............................... 59-261417
Dec. 11, 1984 [JP] Japan ............................... 59-261418

[51] Int. Cl.$^4$ ............................................. F02B 37/12
[52] U.S. Cl. .................................................. 60/602
[58] Field of Search ................... 60/600, 601, 602, 603

[56] References Cited

U.S. PATENT DOCUMENTS 4,392,352 7/1983 Stumpp et al. ........................ 60/602

FOREIGN PATENT DOCUMENTS 212626 10/1985 Japan .................................. 60/602
228727 11/1985 Japan .................................. 60/602
228728 11/1985 Japan .................................. 60/602
2160260 12/1985 United Kingdom ................ 60/602

Primary Examiner—Michael Koozo
Attorney, Agent, or Firm—Schwartz, Jeffery, Schwaab, Mack, Blumenthal & Evans

[57] ABSTRACT

A turbocharger including an exhaust turbine and a compressor is controlled using a variable geometry apparatus at the inlet of the exhaust turbine and an exhaust bypass valve bypassing the exhaust turbine. Operating conditions of the engine driven by the turbocharger are detected as is the supercharging pressure produced by the compressor. A deviation between the detected supercharging pressure and a target supercharging pressure is calculated and integrated. A controlled variable is calculated for actuating at least one of the variable geometry apparatus and the exhaust bypass valve based on the operating conditions and a learned value. Feedback control is used to correct the controlled variable in accordance with the integrated value of the deviation. A determination is made as to an operating range in which feedback control is to be performed and the learning amount is calculated in accordance with the result of the operating range determination and the integrated value of the deviation.

14 Claims, 36 Drawing Figures

FIG. 9
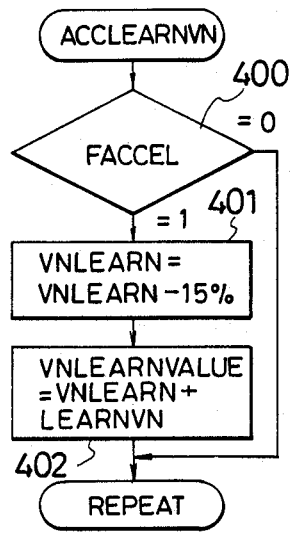
FIG. 10
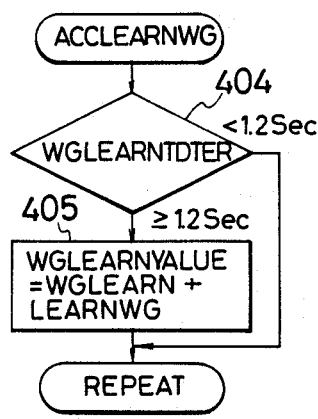
FIG. 11(A)
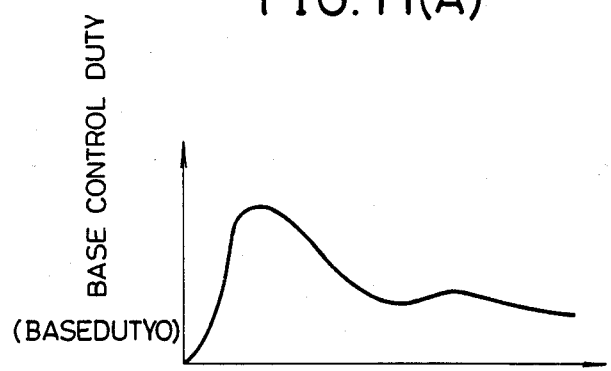
FIG. 11(B)
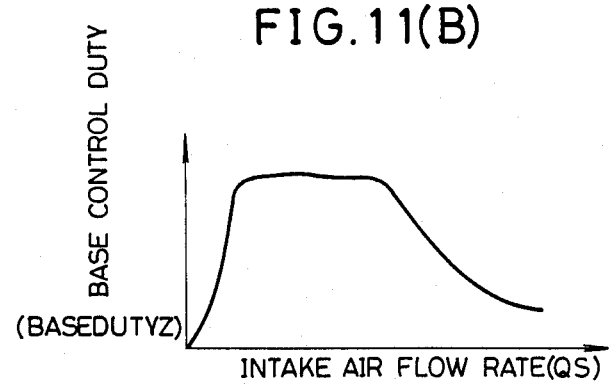
FIG. 11(C)
| QS | ADDRESS | CONTROL DUTY |
|---|---|---|
| 0 0 | 0 | 0 3 |
| 0 1 | 1 | F 0 H |
| ⋮ | ⋮ | ⋮ |
| 0 FFH | 0 FFH | 3 0 H |

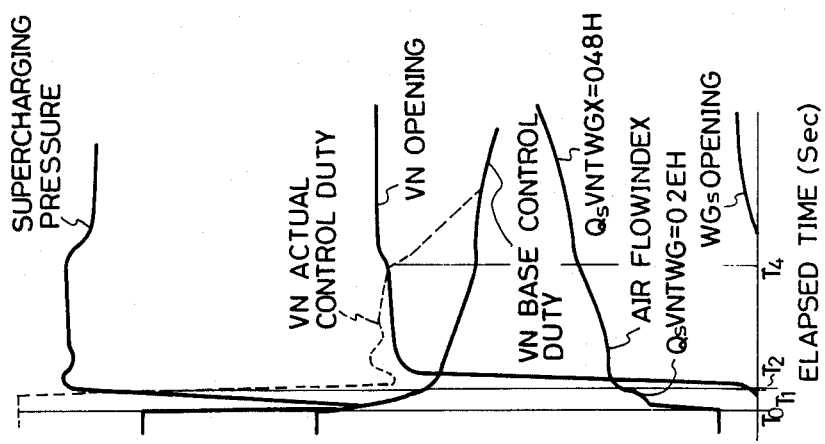
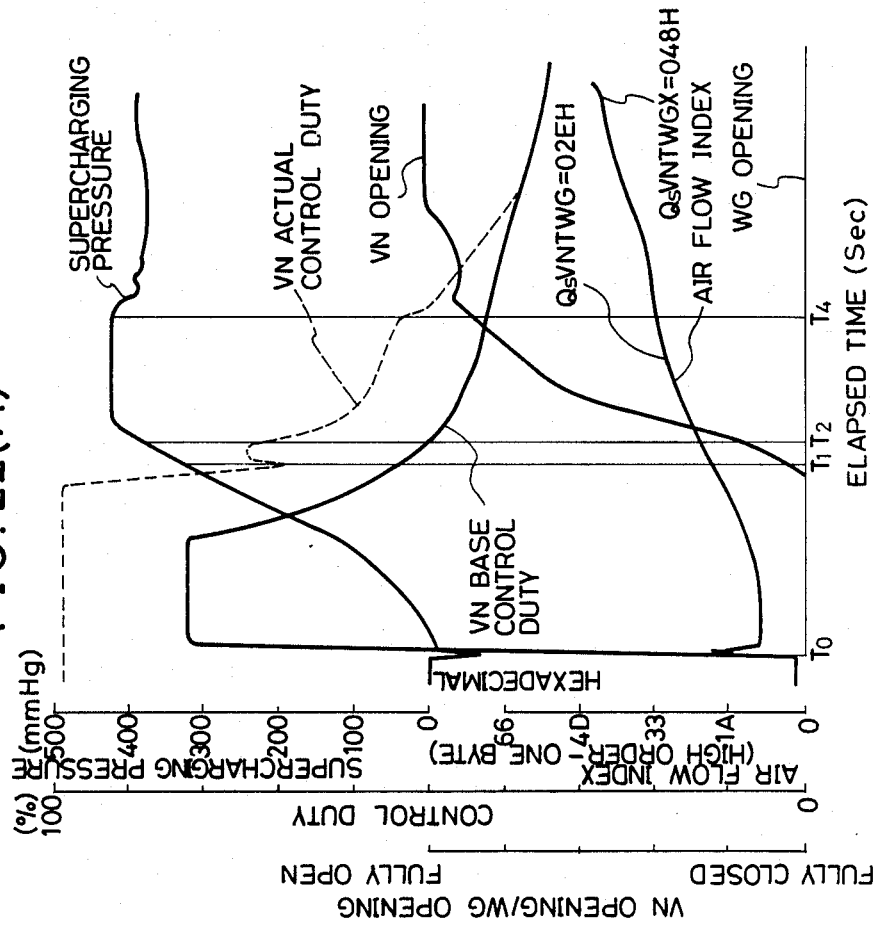

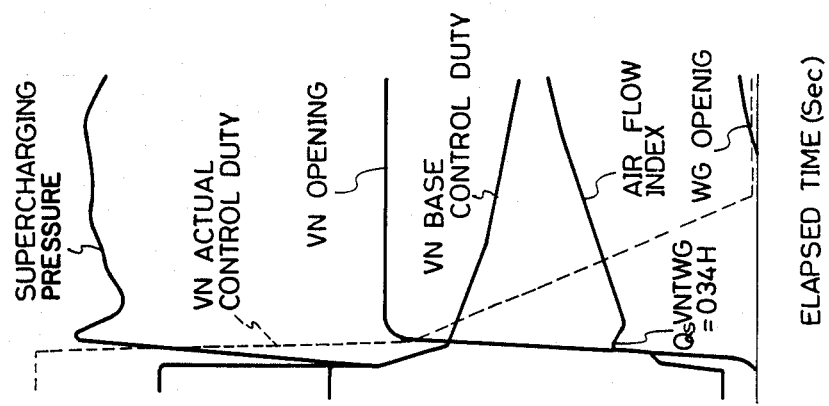
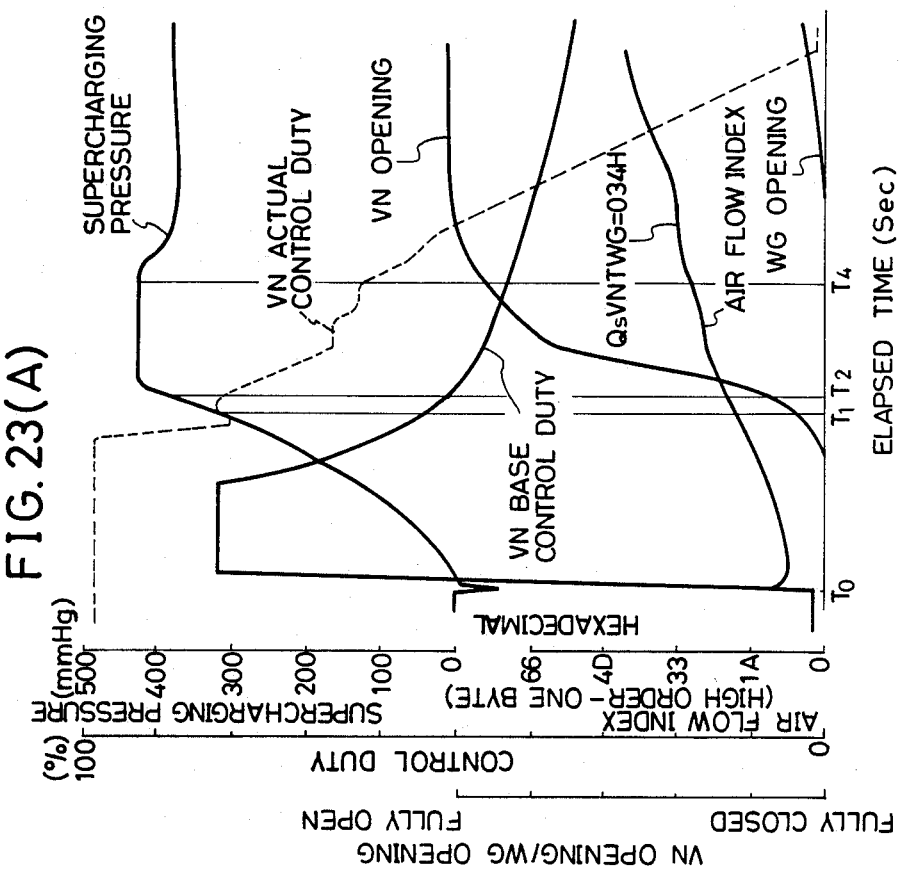

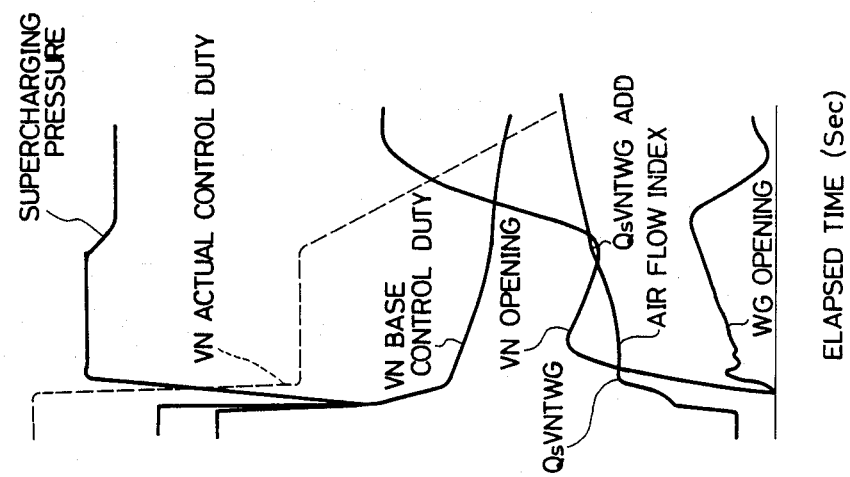
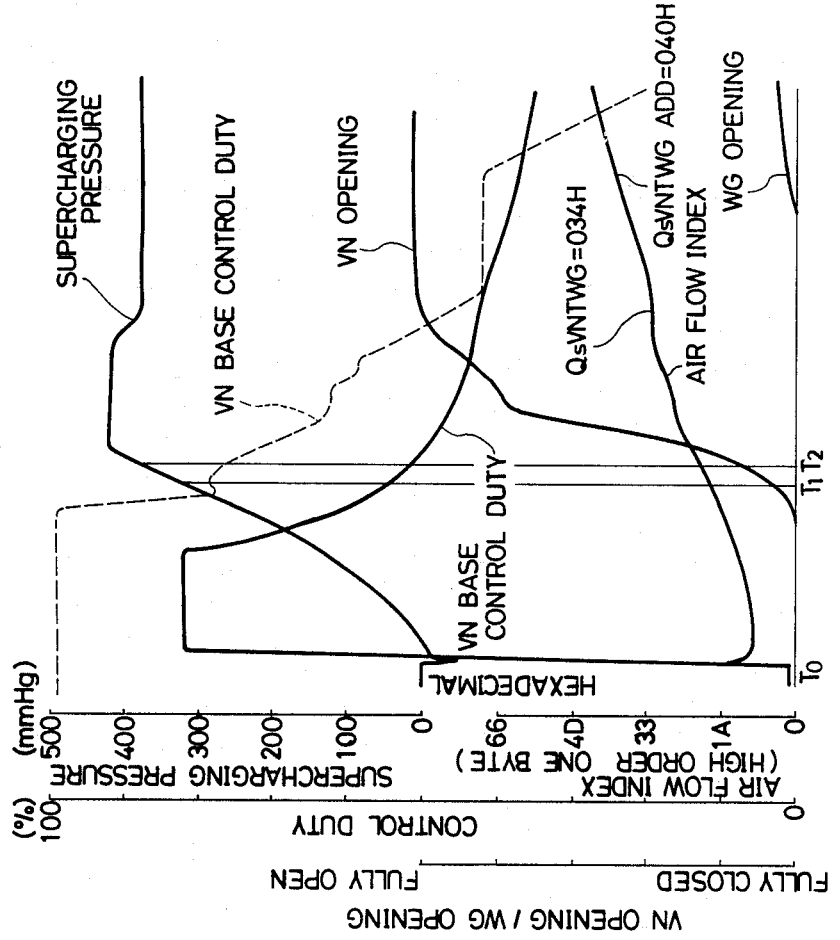

METHOD OF CONTROLLING SUPERCHARGING PRESSURE IN TURBOCHARGER AND APPARATUS FOR SAME

FIELD OF THE INVENTION

This invention relates to a supercharging pressure control mechanism in a turbocharger.

BACKGROUND OF THE INVENTION

A turbocharger uses the high temperature and high pressure energy of the exhaust gas to turn an exhaust turbine at high speed. The exhaust turbine is coaxial with and helps drive the compressor. Along with increasing the rpm of the compressor, it is also capable of raising the pressure in the air intake manifold so that it is greater than atmospheric pressure. From this supercharging pressure, a large volume of intake air can be supplied to the engine.

For a vehicle engine with a wide range of rpm speeds, in the medium-to-high speed operating range a sufficient supply of supercharging pressure can be maintained. However in the low speed operating range it is difficult to obtain a sufficient amount of exhaust pressure. Therefore, supercharging pressure cannot be obtained. This leads to an insufficient low speed torque.

In this case, a determining factor of the supercharging pressure in the low speed operating range is given by the ratio of the scroll cross-sectional area A, and the radius measured from the center R, that is A/R. If the area A can be made small, even in the low speed operating range where the amount of exhaust gas is small, the rpm can be increased and the rise in supercharging pressure can be quickened.

In this way, it has been required to develop the turbocharger so that even in the low speed operating range, a sufficient amount of supercharging pressure can be obtained. However, in this improvement the following problems are uncovered.

A controlling solenoid valve is necessary to improve the control of supercharging pressure. In the solenoid valve, if there are differences in tolerance from part to part or if changes in tolerance occur with use, the shifts from the target control values caused by this can be corrected by feedback control.

However, since the engine transition time, which is characteristic to the feedback control, is sometimes not in time with the feedback control, the supercharging pressure will shift from the target control value. For example, when the air intake quantity is suddenly increased by stepping on the accelerator pedal, the control value corresponding to the air intake quantity changes and it is necessary to largely make corrections for the shift. Because of this, for a short period of time, it is difficult to follow and respond to the feedback control. During this time the supercharging pressure will differ greatly from the target control value. Therefore, it is required to find a learning amount based on the feedback, correction for use in the succeeding control.

Also, when the engine transition time is not in time with the feedback control, it is desirable to use a learning control system that will remove the shift from the target control value and improve the response of the system. The learning control is a system that learns the amount of feedback correction found through the feedback control. Whether or not the proper learning amount is obtained is controlled by the period of the feedback control during which the learning is performed. Improvement in control precision due to learning control cannot be expected if the calculation timing control for the learning is not optimally performed.

Further, in the case where a variable geometry means is installed in a turbocharger to control the supercharging pressure, if only the variable geometry means is controlled with the feedback control, the control precision of the controlling range covered by the variable geometry means could be increased. However, if the arrangement of the exhaust bypass valve varies, the control precision of the controlling range covered by the exhaust bypass valve means would decrease.

In trying to increase the control precision both of the ranges covered by the exhaust bypass valve means and the variable geometry means simply by performing feedback control with multiple control means, the multiple control methods interfere with each other and proper control cannot be performed. For example, when the variable geometry means shifts from the optimum position to the closing side, the exhaust bypass valve means shifts from the optimum position to the opening side, and as a whole, the supercharging pressure is maintained at the target control value. However, in order to obtain the maximum engine capabilities, the variable geometry means and the exhaust bypass valve means must have optimum positions. If they shift from that position as in the case mentioned above, the turbine capacity becomes small and the engine output drops.

In addition, it is effective if overboost control is performed when accelerating suddenly to improve the acceleration capabilities. The overboost control, temporarily raises the target supercharging pressure so that a high supercharging pressure can be obtained improving the engine output. When applying the overboost control to a supercharging pressure control that avoids the interference of multiple control, the control mechanism will switch from the variable geometry means to the exhaust bypass valve means during overboost control. Even if the exhaust bypass valve means is completely closed in the case where the turbine capacity is large, the target supercharging pressure sometimes cannot be obtained during overboost control. That is to say, when suddenly accelerating and overboost control is performed, the target supercharging pressure is raised to the higher target supercharging pressure. In obtaining this higher target supercharging pressure, as previously mentioned, it is necessary that the control duty value in the control through the variable geometry means is large and that the opening of the variable geometry means is made smaller (moves toward the closing side). However, when suddenly accelerating in operating with a large load especially, the operating range to switch the control is attained during overboost control to be switched over to the control through the exhaust bypass valve means. Consequently, the control duty value in the control through the variable geometry means after switching becomes small. This small control duty value is unable to maintain the small opening of the variable geometry means, and adversely the opening of the variable geometry means gets large making it difficult to obtain the higher target supercharging pressure during overboost control.

SUMMARY OF THE INVENTION

This invention was developed for the purpose of solving the aforementioned problems.

The first objective of this invention is to provide a turbocharger supercharging pressure control mechanism that enables the turbocharger to obtain a sufficient supercharging pressure even in the low speed operating range.

Another, objective of this invention is, to provide a supercharging pressure control mechanism for a turbocharger which overcomes the problems such as the shift from the target control value due to response lag of the engine transition time and the shift due to differences in tolerance of parts or changes in tolerance over time by finding a learning amount based on the feedback correction amount and adding it to the next controlled variable.

Another objective of this invention is to provide a turbocharger supercharging pressure control mechanism which improves the response and control precision of the supercharging pressure control by optimally setting up a calculation timing control for the learning amount.

Another objective of this invention is to provide a supercharging pressure control mechanism for a turbocharger in which the high target supercharging pressure will be obtained during overboost control without dropping the engine output.

Another objective of this invention is to provide a supercharging pressure control mechanism for a turbocharger in which the feedback control is divided into operating areas and each operating area is placed in a predetermined control mode, namely the variable geometry control performed through the variable geometry means or the exhaust bypass valve control performed through the exhaust bypass valve means. The control switching in the control means is conducted with reference to the operating range identified on the basis of the actual operating condition, performing feedback control by selecting which control to perform with the other being fixed while evading improper control due to interference of the multiple methods.

Another objective of this invention is to provide a supercharging pressure control mechanism for a turbocharger which can calculate an accurate learning amount for the variable geometry means in suitable timing to improve the response and precision of the supercharging pressure control.

Another objective of this invention is to provide a supercharging pressure control mechanism for a turbocharger which can calculate an accurate learning amount for the exhaust bypass valve means in suitable timing to improve the response and precision of the supercharging pressure control.

Another objective of this invention is to provide a supercharging pressure control mechanism for a turbocharger which can calculate an more accurate learning amount for the variable geometry means by the control range of the variable geometry control magnified during overboost control to improve even more the response and precision of the supercharging pressure control.

Another objective of this invention is to provide a supercharging pressure control mechanism for a turbocharger which can optimally control the supercharging pressure of the complete operating range even if there is a difference in tolerance of parts or a change in tolerance occurs over time, especially, improving the capability of acceleration.

A further objective of this invention is to provide a supercharging pressure control mechanism for a turbocharger that does not require strict management of the installation precision of parts but is capable of simplifying the operation for regulation on the production line.

A still further objective of this invention is to provide a supercharging pressure control mechanism for a turbocharger which, during overboost control, the control can continuously be made through the variable geometry means, to optimally control the opening of the variable geometry thereby obtaining the target supercharging pressure upon overboost control without loss in turbine efficiency and increasing the engine output and improve the acceleration capabilities.

SIMPLE EXPLANATION OF DRAWINGS

Figure 12A:
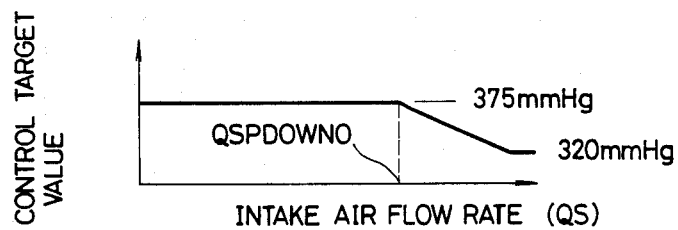
Figure 12B:
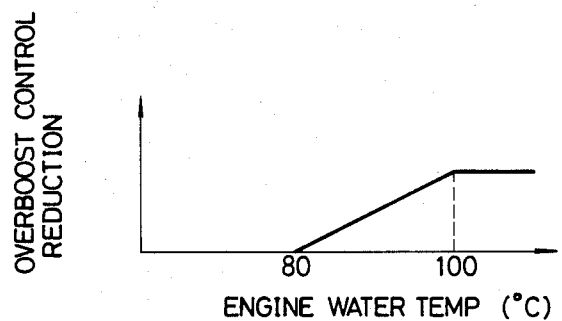
Figure 13:
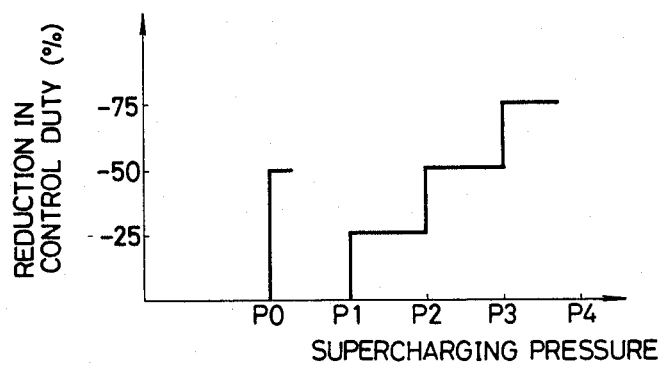
Figure 14A:
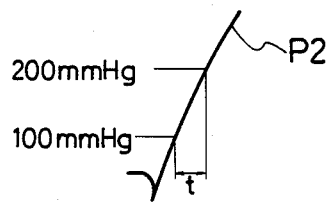
Figure 14B:
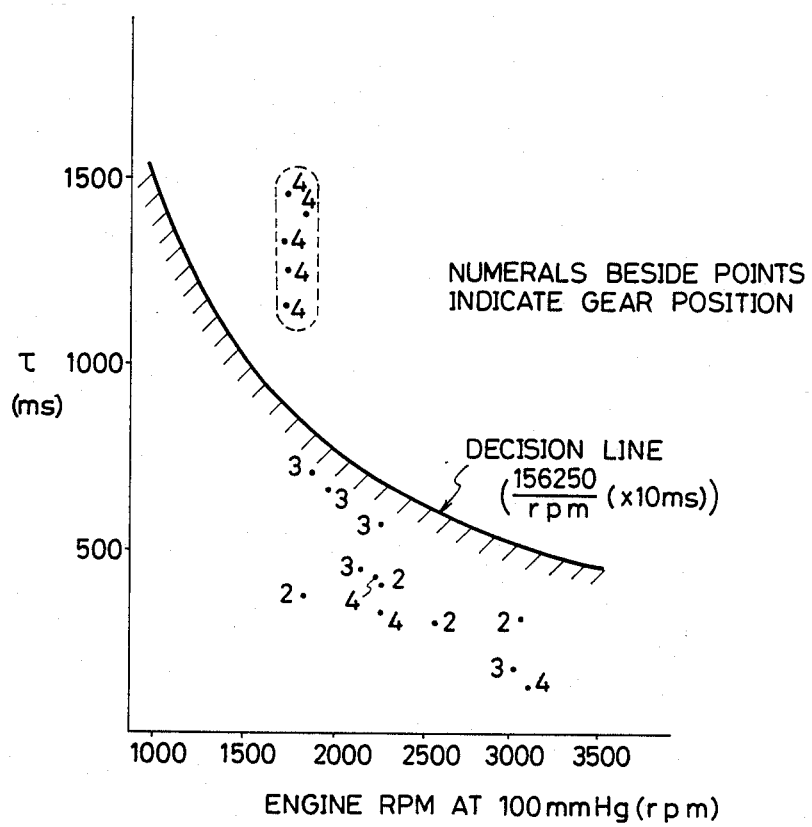
Figure 15:
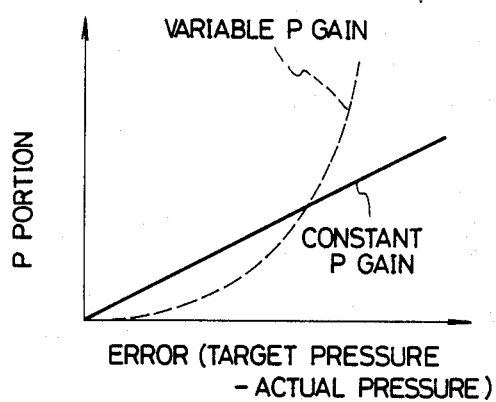
Figure 16:
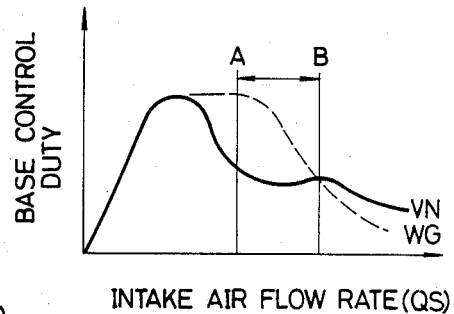
Figure 17:
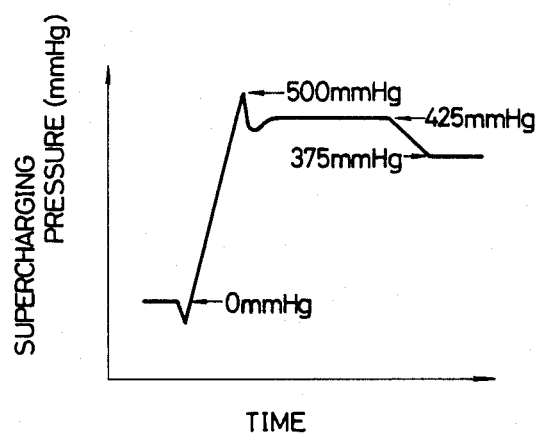
Figure 18:
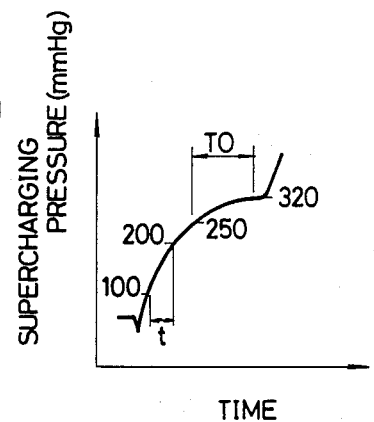
Figure 19:
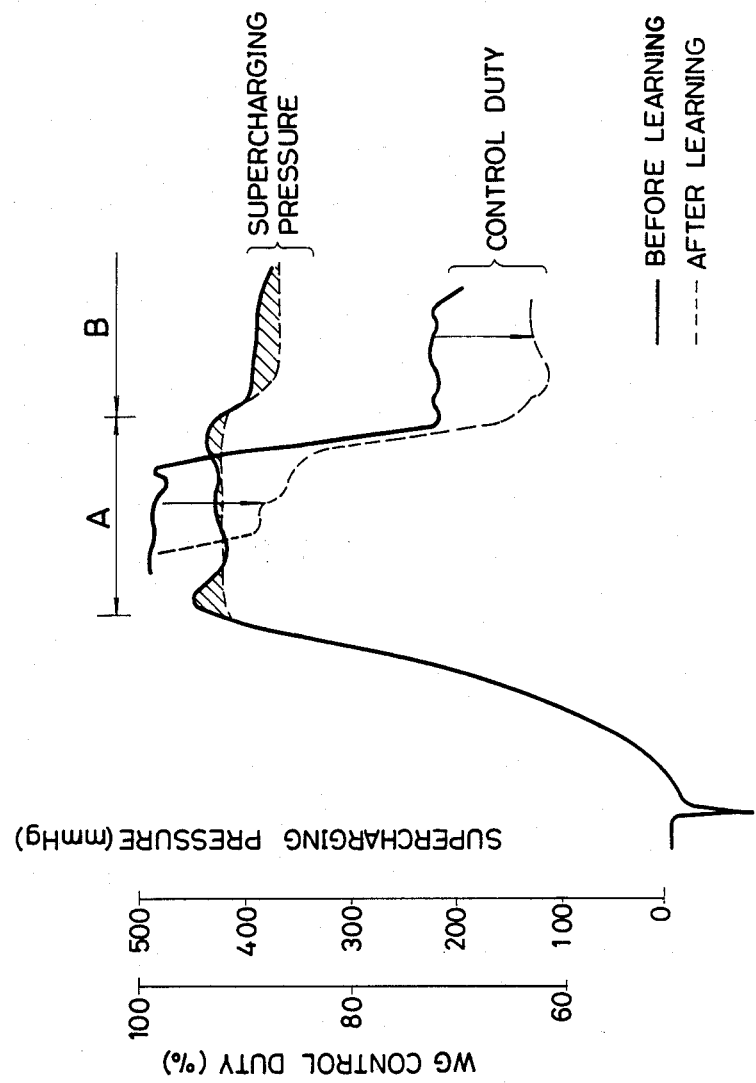
Figure 20:
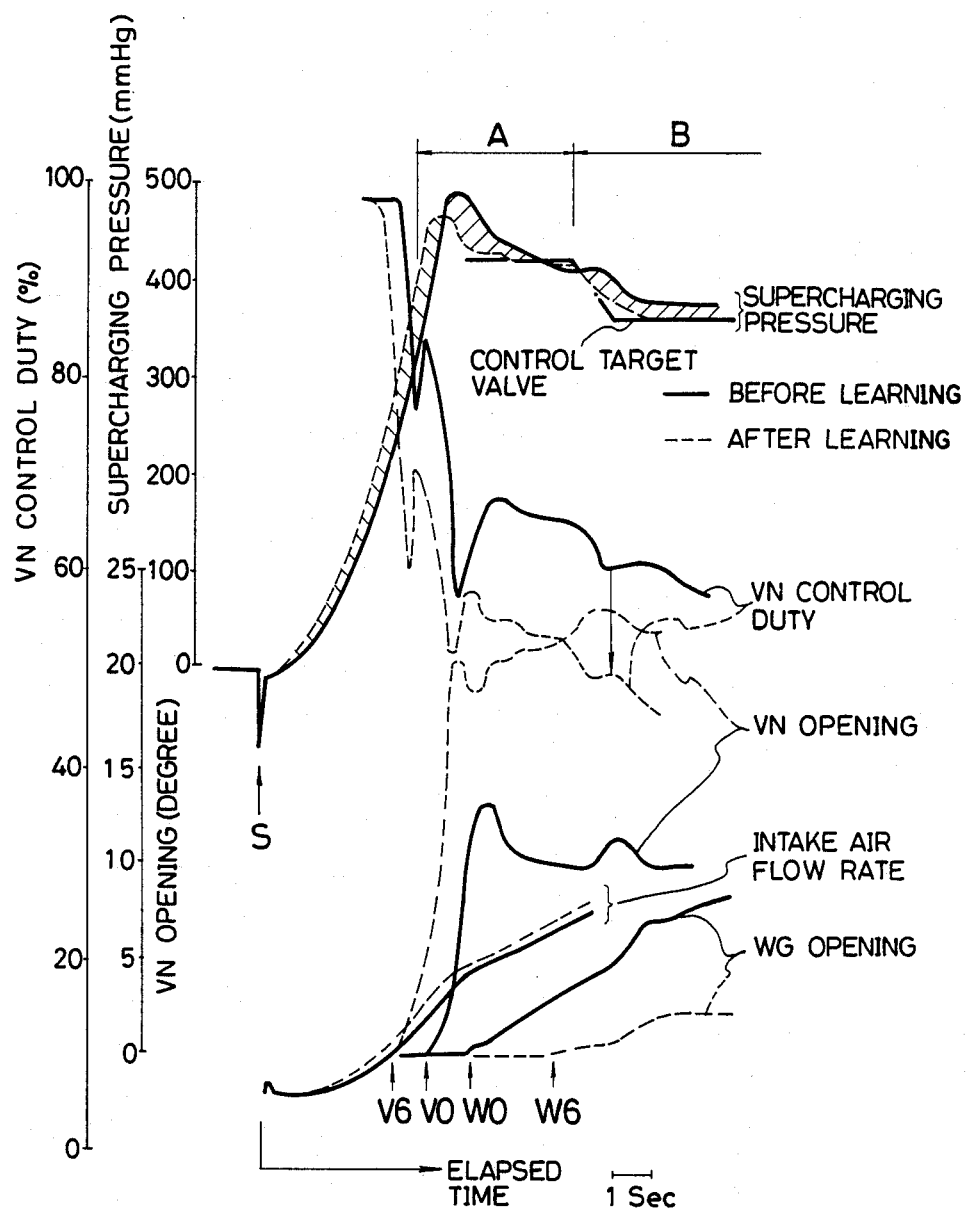
Figure 21:
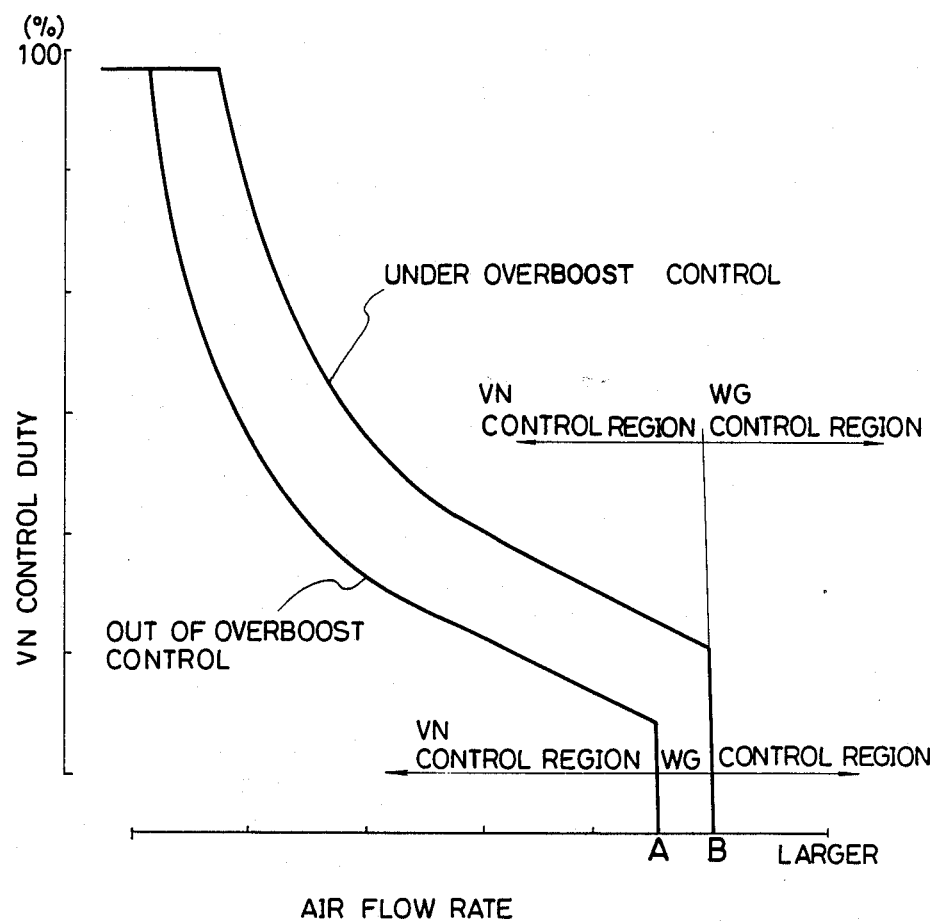

FIGS. 6(A)–(C), FIGS. 7(A)–(C), FIG. 8(A) and FIG. 8(B), FIG. 9 and FIG. 10 is a flowchart showing the operation of the first example;

FIG. 11(A) and FIG. 11(B) are drawings showing basic control duty of the VN and WG;

FIG. 11(C) is a table showing the QS-basic control duty relationship;

FIG. 12(A) is a characteristic drawing of the target control values with respect to QS;

FIG. 12(B) is a characteristic drawing showing the decrease of the overboost controlled variable with respect to the engine water temperature;

FIG. 13 is a drawing showing the reduction rate of the control duty with respect to the supercharging pressure in order to explain the overboost measures and the failsafe;

FIG. 14(A) explains ($\tau$);

FIG. 14(B) shows the relation between the engine rpm speed and ($\tau$) at 100 mgHg;

FIG. 15 shows the relation between the deviation ERROR and the correction amount P;

FIG. 16 shows the control ranges of VN and WG with respect to QS;

FIG. 17 shows the supercharging pressure characteristics which illustrates overshoot during sudden acceleration;

FIG. 18 shows the supercharging pressure characteristics which illustrates the error prevention of the sudden acceleration decision;

FIG. 19 shows the functions and effects of the first operation example before and after learning control;

FIG. 20 shows the functions and effects of the second example before and after learning control;

FIG. 21 shows a comparison of the VN control duty during and not during overboost control;

FIG. 22(A) and FIG. 22(B) shows the functions and effects of sudden acceleration from a small load and also from a high load condition;

FIG. 23(A) and FIG. 23(B) also FIG. 24(A) and FIG. 24(B) show the functions and effects of an example of different construction of the aforementioned example but run under identical operating conditions wherein FIG. 23(A) and FIG. 24(A) correspond to FIG. 22(A), and FIG. 23(B) and FIG. 24(B) correspond to FIG. 22(B).

DETAILED DESCRIPTION OF PREFERRED EMBODIMENTS

Figure 1:
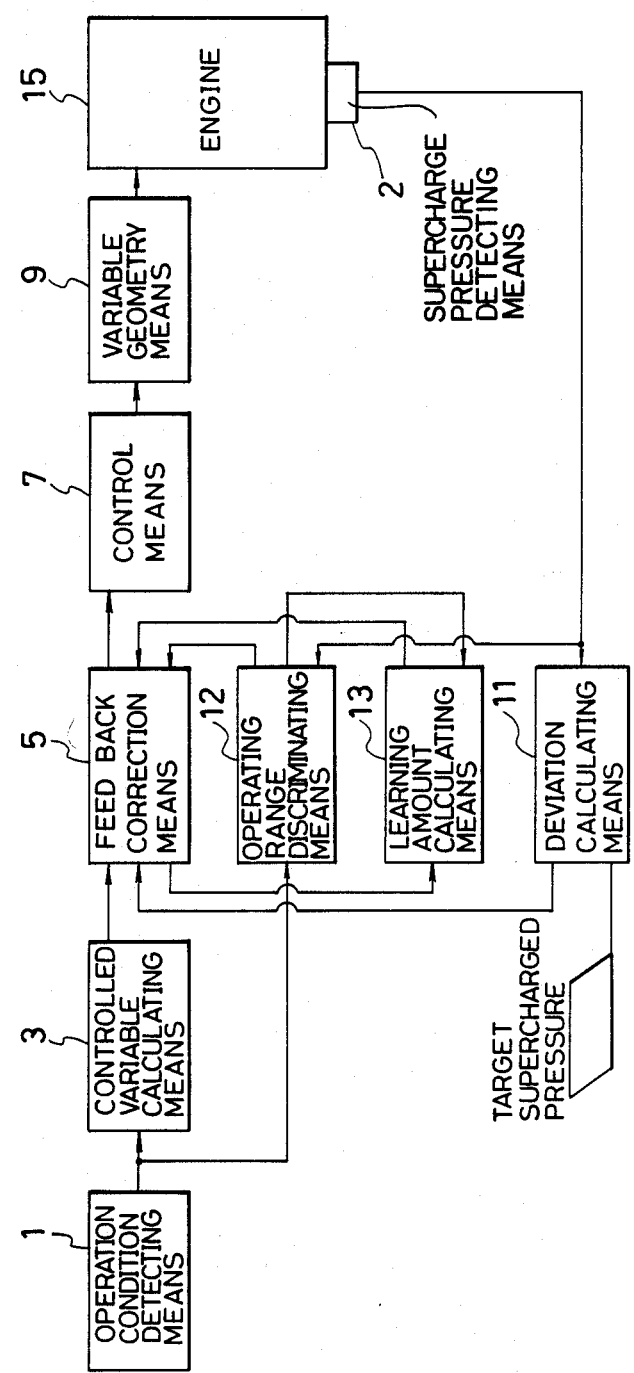
FIG. 1 is a diagram showing a whole structure incorporating a first example of this invention.
Figure 2:
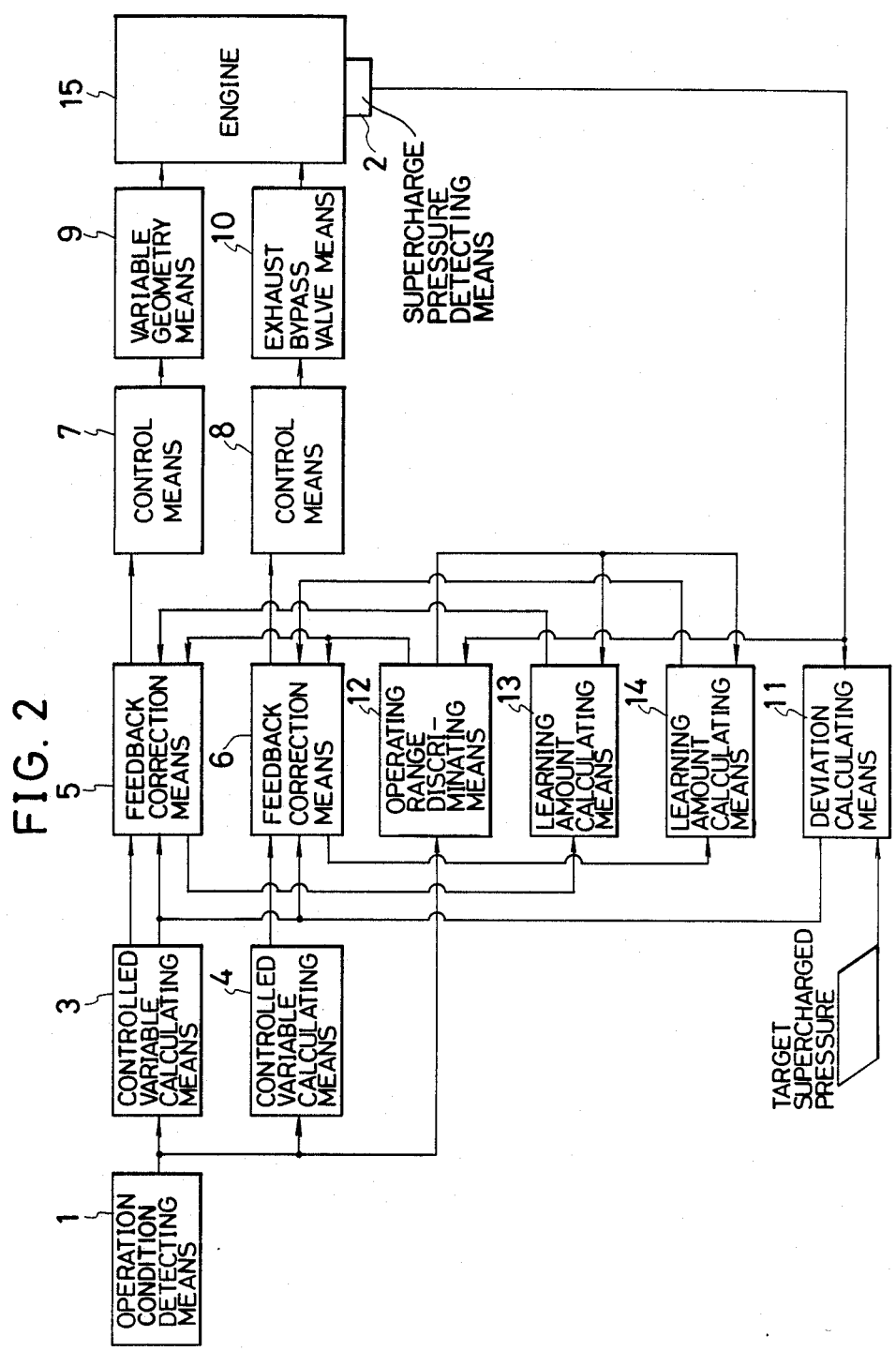
FIG. 2 is a diagram showing a whole structure of a second example of this invention.
Figure 3:
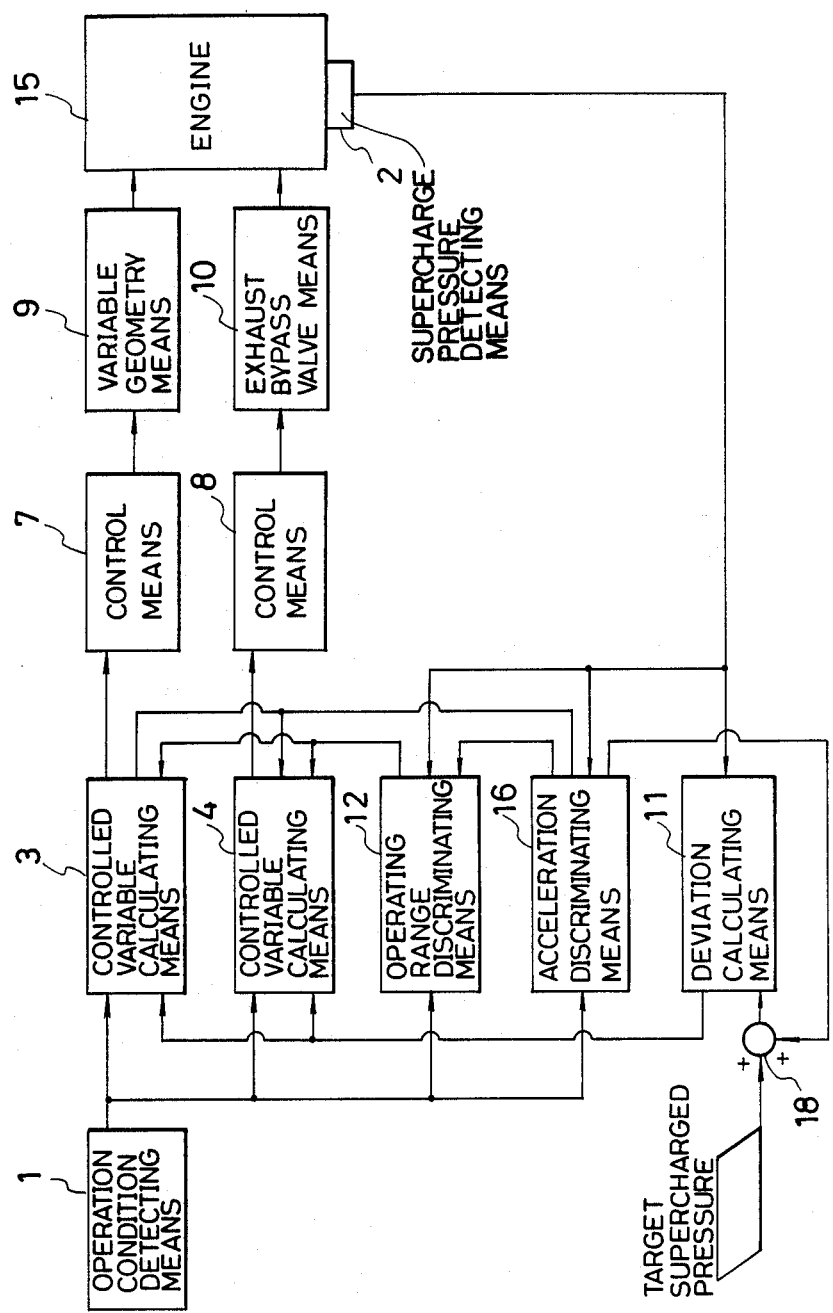
FIG. 3 is a diagram showing a whole structure of a third example of this invention.

FIGS. 1 to 3 are a diagram of the whole structure of first to third examples of this invention, respectively. Operation condition detecting means 1 detects operating conditions of engine 15. It detects a parameter representative of the operating condition such as the air intake quantity. Supercharging pressure detecting means 2 detects the actual supercharging pressure of the turbocharger compressor (not shown in FIGS. 1 to 3).

In the first example of FIG. 1, a controlled variable calculating means 3 computes the amount of control corresponding to at least one of a variable geometry means 9, and an exhaust bypass valve means (not shown) of an exhaust gas turbine, based on the previously discussed operating conditions. A feedback correction means 5 provides feedback correction for a controlled variable corresponding to the integrated value of the deviation determined by deviation calculation means 11, discussed below. A control means 7 controls at least one of the variable geometry means 9 and the exhaust bypass valve corresponding to the previously discussed controlled variable. The deviation calculating means 11 calculates an integrated value of deviation of the actual supercharging pressure from a target supercharging pressure as an operationg condition. An operating range discriminating means 12 discriminates or decides the operating region where feedback control is carried out.

With this example of the present invention, a learning amount calculating means 13 computes the amount of learning for at least one of the variable geometry means 9 and the exhaust gas bypass, valve corresponding to the decision results for the previously discussed operating region and the integrated value of the previously discussed deviation. Then, the feedback correction means 5 provides correction for the previously mentioned controlled variable, based on this learning amount.

With the usual feedback control which does not have a learning function, a difference in operating tolerance of a solenoid valve which comprises the control means 7 causes a stationary deviation from an initially set value. Control is performed so that the large lag from the addition of this steadily changing lag to the variation from the control target value corresponding to the operation status is eliminated. For this reason, at the time of transient operation, because of the delay in response, the lag from the control target value (the target supercharging pressure) widens, and the deviation goes to the higher side of the control target value, so that engine life becomes a problem. Or it can lag on the lower side of the target so that adequate supercharging pressure is not obtained and acceleration performance is harmed. However, when a learning function is provided, as in the present invention, the first time control is carried out so that the large lag, including the steadily increasing lag, is made to disappear. In the following controls, the steadily increasing lag is eliminated by the learning function, and because the control is done by the so-called accurate initial set value, even during transient operation the correction band may be narrow, and both control response and control accuracy are improved.

In the second example of FIG. 2, the supercharging pressure is controlled by variable geometry means 9 which changes the ratio A/R of the exhaust turbine, and exhaust bypass valve 10. A first controlled variable calculating means 3 and a second calculating means 4 calculate a first and second controlled variable of the variable geometry means 9 of the exhaust turbine and of the exhaust bypass valve means 10, based on a parameter of the operating condition including an integrated value of deviation between a target supercharging pressure and an actual supercharging pressure calculated by a deviation calculating means 11. A first feedback correction means 5 and a second feedback correction means 6 correct through feedback a first controlled variable and a second controlled variable in accordance to the integrated value of deviation. A first control means 7 and a second control means 8 control the variable geometry means 9 and the exhaust bypass valve 10 in accordance to the aforementioned first and second controlled variables. An operating range discriminating means 12 discriminates or identifies which operating range to perform feedback control in. Along with this it selects whether to perform feedback control in the aforementioned variable geometry 9 means or the exhaust bypass valve means 10. A first learning amount calculating means 13 and a second learning amount calculating means 14 calculate the learning amount relating to the variable geometry means 9 and the exhaust bypass valve means 10 in accordance to the aforementioned operating range discrimination and the integrated value of deviation. The aforementioned first and second feedback correction means 5 and 6 correct the first and second controlled variables based on the learning amount.

In one mode of the second example, as stated above, the first and second feedback correction means 5 and 6 correct the controlled variable of variable geometry means 9 which changes the ratio A/R of the exhaust turbine in accordance with operating conditions, and correct the controlled variable of the exhaust bypass valve 10, based on the calculated integrated value of deviation of the actual supercharging pressure from the target control value. Also the first and second learning amount calculating means 13 and 14 calculate the learning amount of the variable geometry means 9 and of the exhaust bypass valve 10 in accordance to the operating range discrimination and integrated value of deviation, whereby the aforementioned first and second controlled variables are corrected based on the learning amount. When switching the feedback control from the variable geometry control to the exhaust bypass valve control, the first learning amount calculating means 13 calculates the learning amount of the variable geometry means 9.

The second example can be modified in a second mode such that after a ptedetermined time elapses from the point when the feedback control is switched from the variable geometry control to the exhaust bypass valve control, the second learning amount calculating means 14 calculates the learning amount of the exhaust bypass valve 10.

The second example can further be modified in a third mode such that an overboost control means is provided to raise the target supercharging pressure during a designated time when sudden acceleration is discriminated, and after the overboost control is performed and when the feedback control is switched from the variable geometry control to the exhaust bypass valve control, the first learning amount calculating means 13 calculates the learning amount of the variable geometry means 9.

The feedback correction amount used in the feedback control comes closer to the proper deviation from the target control value during the later period of the feedback control. Because of this, the optimum deviation of the control target value occurs when the feedback control is switched.

The optimum control timing of the learning amount of the variable geometry means occurs when the feedback control is switched from the variable geometry control to the exhaust bypass valve control. At this time the feedback correction amount in the variable geometry control is learned. This amount is used to influence the feedback control in the following variable geometry control. When this happens the correction width of the transient operating time is small and this improves the supercharging pressure control response and the control precision.

For the calculating timing of the learning amount of the exhaust bypass valve means, after the feedback control has been switched from the variable geometry control to the exhaust bypass valve control, learning must be performed when the working (opening) of the variable geometry means is sufficiently stabilized with the feedback correction amount of the exhaust bypass valve means becoming constant. Because if this, it occurs after a designated period of time after switching, for example considering the response lag of the variable geometry means which completely opens. For example, if the feedback correction amount was learned before the variable geometry means was completely opened, and this value was used to control the supercharging pressure of the feedback correction range of the exhaust bypass valve control, there still remains a stationary deviation in the learning amount when the variable geometry means is completely opened after switching. Therefore, even though much trouble was taken to remove the stationary deviation using the learning control, the transient response gets worse. Concerning this, in the second mode mentioned above, when the variable geometry is completely opened, the feedback correction amount, after the turbocharger capacity becomes a maximum, is learned as the learning amount of the exhaust bypass valve. Because of this, the learning does not contain the stationary deviation and this value is used to influence the following feedback control in the exhaust bypass valve control. When this happens, the correction width of the transient operating time is small and this improves the supercharging pressure control response and control precision.

In case where the overboost control is performed, the control range of the variable geometry control is increased during overboost. Because of this, the feedback control time becomes long and the feedback correction amount comes close to the proper deviation from the target control value. Therefore, in the third mode, after overboost control is performed, the learning amount of the variable geometry means is calculated during switching of the feedback control to the exhaust bypass valve control, thereby further improving the supercharging pressure control response and control precision when compared to cases where overboost control is not performed.

A third example of the present invention, specifically the points of difference between it and the previously discussed examples will now be explained referring to FIG. 3.

The first and second control means 7 and 8 respectively control the variable geometry means 9 and an exhaust gas bypass valve means 10, corresponding to the amount of control computed by the first and second controlled variable computing means 3 and 4 These control means 7 and 8 comprise a plurality of control means which carry out feedback control based on the deviation from a target supercharging pressure, and they control the respective supercharging pressures to the target supercharging pressure. The operating region decision means 12 judges the operating region which was previously set based on parameters showing the operating status, such as, for example, the intake air volume and the supercharging pressure, which is detected by the previously mentioned supercharging pressure detection means 2. The computation of the controlled variable corresponding to the previously mentioned deviation, based on these decision results, can be carried out selectively by either of the first and second controlled variable computation means 3 or 4.

In this example of the present invention, an overboost control means is provided which increases for the fixed time period the target supercharging pressure in the case where fast acceleration is determined to be present. During this overboost control time, there is a widening of the operating range in which feedback control is carried out by the previously mentioned variable geometry means. Specifically, the overboost control means comprises an acceleration discrimination means 16 which decides when fast acceleration is present, an addition means which adds the acceleration correction amount in the case where fast acceleration is present, and an addition means 18 which adds the increase portion of the target supercharging pressure when fast acceleration is present. Among them, the function of the addition means which adds the increased portion of the acceleration can be provided by the first and second controlled variable computation means 3 and 4.

In a conventional example, in fast acceleration at a time of high loading when the intake air flow volume is comparatively large, a switch in control is made to the exhaust bypass valve control during overboost control, it is difficult to get a high target supercharging pressure during overboost control because it is impossible to maintain a small degree of opening of the variable geometry means with a small control duty after the switch. On the other hand, with the present invention, the control region of the variable geometry control is wide during overboost control, so that during overboost control, the control of the variable geometry control continues as is, the controlled variable of the variable geometry means is large, and even if the objective supercharging goes up, it is possible for the degree of opening of the variable geometry means to be small, thereby providing a higher target supercharging pressure to perform effective control.

Figure 4:
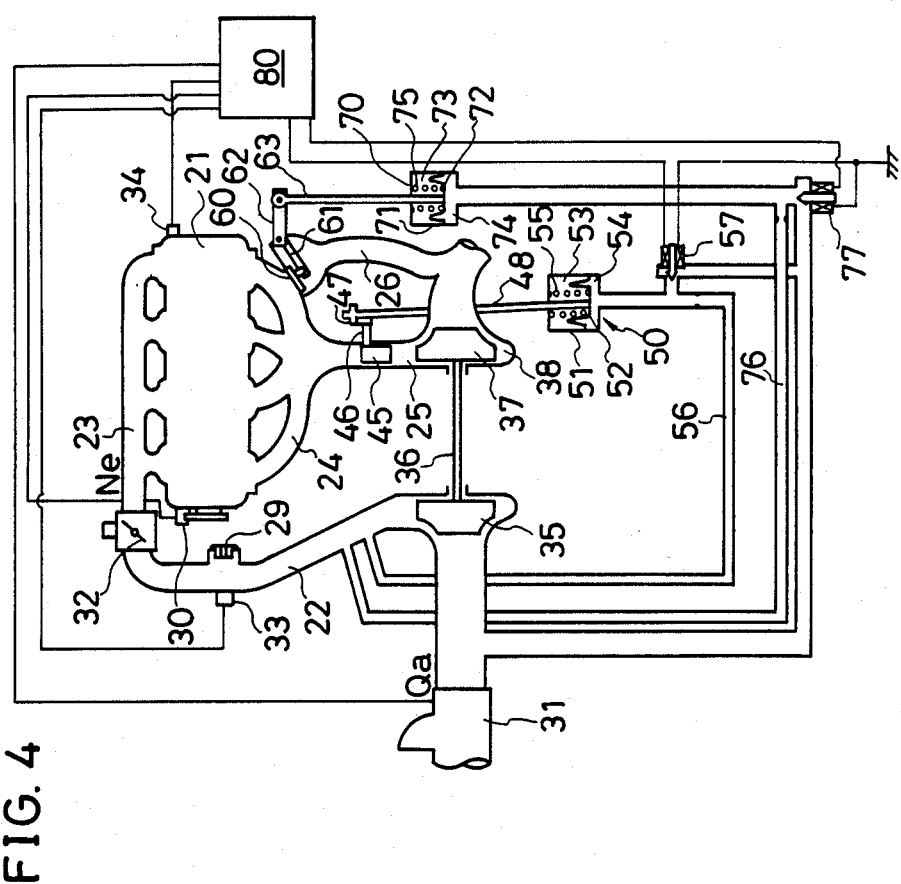
FIG. 4 is an outline drawing of the mechanical structure of the first example.

FIG. 4 is an outline drawing of the mechanical structure of the first example of this invention. As shown in the FIG. 4, air is supplied to engine 21 by way of air inlet pipe 22 and air intake manifold 23, and is exhausted by way of exhaust manifold 24 and exhaust pipe 25. Shown in the left center of the drawing at the end of the bent air inlet pipe 22 is an air flow meter 31 which measures the air intake quantity Qa. Disposed a the bend of air inlet pipe 22 is compressor 35 which is one portion of the turbocharger. The compressor compresses the air which flows through air flow meter 31 and supplies it to engine 21. Mounted to the base end of air inlet pipe 22 adjacent to air intake manifold 23 is throttle valve 32, whereas mounted between throttle valve 32 and compressor 35 in air inlet pipe 22 is escape valve 29.

Figure 5:
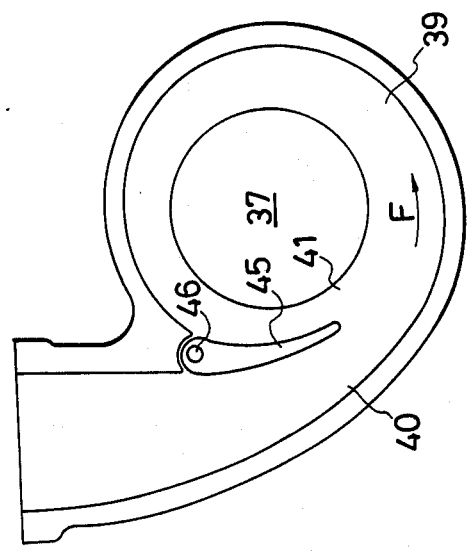
FIG. 5 is a sectional view of the turbocharger scroll section.

In the right center of the FIG. 4, exhaust pipe 25 is shown to have a bend forming turbine casing 38, inside which turbine 37 is placed. Turbine 37 is connected to compressor 35 by way of connecting shaft 36. As shown in FIG. 5, turbine casing 38 is made up of scroll 39 which surrounds turbine 37. The cross sectional area of scroll 39 gradually gets smaller as it goes from passage 40 in the direction of arrow F. Disposed in the mixed flow portion 41 at the end of passage 40 and scroll 39 is a movable tongue 45 as a variable geometry means which is a flap valve. This movable tongue 45 is pivotally supported by shaft 46 so that it is possible to change the area of passage 40.

Movable tongue 45 is located, as shown in FIG. 4, in the exhaust pipe 25 of manifold 23 upstream of turbine 37, in other words in inlet passage 40 of turbine 37. Shaft 46 which pivotally supports the tongue 45 is connected to the upper end of rod 48 by way of arm 47. The lower end of rod 48 is connected to diaphragm 52 of actuator 50 which drives the tongue. Case 51 which houses diaphragm 52 is divided into atmospheric pressure chamber 53 and positive pressure chamber 54 by diaphragm 52. Disposed inside atmospheric pressure chamber 53 is spring 55 which is biased to push diaphragm 52 toward the positive pressure chamber 54. Positive pressure chamber 54 is connected to air inlet pipe 22 downstream of compressor 35 by way of connecting pipe 56. The supercharging pressure which is produced by compressor 35 is supplied to the positive pressure chamber 54, and pushes diaphragm 52 against spring 55 toward the atmospheric pressure chamber 53. Also located in the midway of connecting pipe 56 is solenoid valve 57. When solenoid valve 57 is driven and opened by control unit 80, connecting pipe 56 is communicated with the entrance of the compressor by way of the solenoid valve 57, and the pressure in positive pressure chamber 54 drops. In detail, solenoid valve 57 is controlled by the control duty value by way of control unit 80. As the duty value gets large, solenoid valve 37 opens wider and the pressure of positive pressure chamber 54 drops. Because of this, diaphragm 52 moves downward due to the working of spring 55 of the atmospheric pressure chamber 53. This movement is transmitted to tongue 45 by way of rod 48, arm 47, and shaft 46. Tongue 45 then moves in a direction decreasing the area of exhaust passage 40 of turbine 37, or in other words rotates in the closing direction. As a result of this, the flow rate of fluid to turbine 37 is sped up and the supercharging pressure to engine 21 is raised by compressor 35. In reverse, as the duty value gets smaller, the opening of solenoid valve 57 gets smaller and the pressure in positive pressure chamber 54 increases. Because of this, diaphragm 52 moves up against spring 55 and tongue 45 opens increasing the area of passage 40. As a result of this, the flow rate of fluid to turbine 37 is slowed and the supercharging pressure from compressor 35 to engine 21 decreases.

Provided in the connection of exhaust bypass passage 26 which bypasses turbine 37 and exhaust manifold 24 is exhaust bypass valve or waste gate valve 60, which is connected to one end of rod 63 by way of arm 61 and connector 62. The other end of rod 63 is connected to diaphragm 72 of actuator 70 which drives the exhaust bypass valve 60. Case 71, which houses diaphragm 72, is divided into atmospheric pressure chamber 73 and positive pressure chamber 74 by diaphragm 72. Placed in atmospheric pressure chamber 73 is spring 75 which pushes diaphragm 72 toward the positive pressure chamber 74. Positive pressure housing 74 is connected to air inlet pipe 22 downstream of compressor 35 by connecting pipe 76. The supercharging pressure created by compressor 35 is supplied to positive pressure chamber 74.

Also, solenoid 77 is positioned in the midway of connecting pipe 76. When solenoid 77 is driven and opened by control unit 80, connecting pipe 76 is communicated with the entrance of the compressor by way of solenoid valve 77, and the pressure in the positive pressure chamber drops. In detail, solenoid valve 77 is controlled by the control duty value by way of control unit 80. As the duty value gets larger, solenoid valve 77 opens wider and the pressure in positive pressure chamber 74 drops. Because of this, diaphragm 72 moves downward by the force of spring 75 of atmospheric pressure chamber 73. This motion is then transmitted to exhaust bypass valve 60 by way of rod 63, connector 62, and arm 61, and bypass valve 60 moves in a direction closing bypass passage 26. As the duty value gets small, solenoid valve 77 closes and the pressure of positive pressure chamber 74 increases. Because of this, diaphragm 72 moves upward against the force of spring 75 and exhaust bypass valve 60 is opened. When engine 21 is in a condition of high speed and high load, the supercharging pressure of the intake air supplied to engine 21 by the turbocharger becomes too high. In order to prevent damage to engine 21, part of the exhaust gas of engine 21 is exhaust to the outside by exhaust bypass valve 60. The exhaust gas supplied to turbine 37 is then decreased and a suitable supercharging pressure is sent to engine 21.

Control unit 80 is a microcomputer made up of a microprocessor, memory, and input-output interface including an A-D converter. Through this interface, control unit 80 receives the air intake quantity from air flow meter 31, engine rpm from crank angle sensor 30 and cooling temperature sensor 34 on the left side of engine 21 and the supercharging pressure from supercharging pressure sensor 33. Control unit 80 according to this information suitably controls the duty value which drives solenoids 57 and 77. By moving tongue 45 to change the cross sectional area of inlet passage 40 of turbine 37, and also by changing the amount of exhaust gas to turbine 37 by way of exhaust bypass valve means 60, the supercharging pressure of intake gas supplied to engine 21 can be controlled in accordance to the air intake quantity Qa, thereby increasing the torque in the whole operation from a low speed operating range to a high speed operating range.

Next, the flow diagrams in the case where, a variable capacity means (movable flapper) and a waste gate valve (exhaust gas bypass valve) are controlled with a microcomputer, are given in FIG. 6(A) to FIG. 10. The figures in the diagrams are the step numbers. The variable geometry means is identified by the code VN, and the waste gate valve by WG. The signals which indicate the operating status, such as engine RPM and intake air volume are recorded in memory.

Figure 6A:
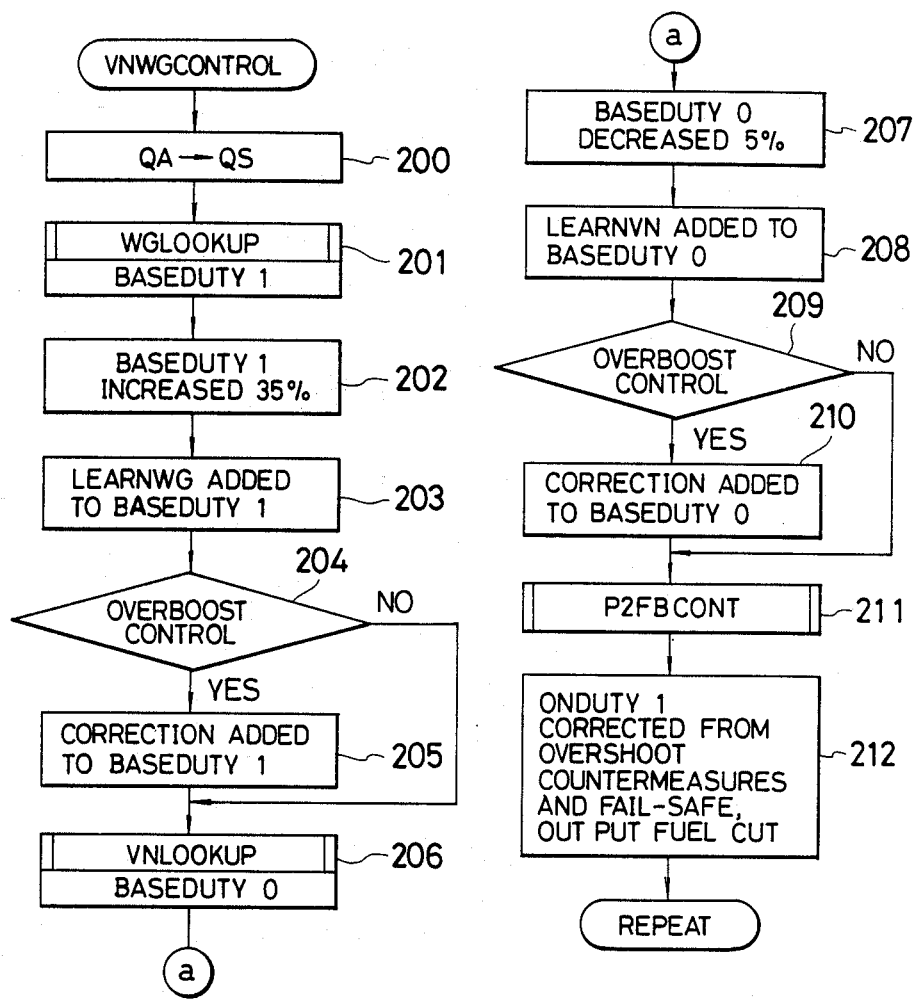

Now referring to FIG. 6(A), it will be seen that the program for the supercharging pressure control VNWGCONTROL is carried out on a fixed cycle (control cycle), and this program computes the controlled variable to control VN and WG to make the actual supercharging pressure P2 conform to the control target value for the required supercharging pressure (supercharging pressure target) P2ADAPT, depending on the various operating conditions. An explanation will not be made following the sequence shown in the flow charts. First, at 200, an airflow volume index QS is obtained from the intake air volume QA. Then this QS is used as data for computing the actual control. The following explanation is made designating the intake air volume as QS for convenience. At 201 the base control duty BASEDUTY1 for WG is obtained from the value of QS. At 202, a control duty of 35% is added to BASEDUTY1. This is the amount of correction to prevent WG from opening as a result of a lag in the setting in the WG control, and discrepancies of the parts. For example, in the VN control region, when WG opens as a result of the lag in the setting on the WG side and discrepancies of the parts, VN lags on the closed side to increase the supercharging pressure, and it becomes impossible to perform correct learning for the VN control. Accordingly, setting a large controlled variable for the WG control in advance ensures the reliability of the learning control on the VN control. At 203, a learning amount LEARNWG is added to BASEDUTY1, as required by the learning control, to eliminate a constant or stationary deviation from the control target value produced from the setting lag. In 204, when a fast acceleration occurs, the supercharging pressure is temporarily increased, and a check is made to see whether overboost control is being carried out to improve the acceleration characteristics. On determining that overboost control is being carried out, an acceleration correction quantity is added to BASEDUTY1 at 205 for progressive overboost control. Here, LEARNWG and the acceleration correction give the amount of feed forward control for the WG control. LEARNWG is the learning result up to the previous time, and it can be used to eliminate the control lag based on secure changes and parts discrepancies. This correction and overboost control will be discussed later.

Steps 206 to 210 give the amount of VN feed forward control for BASEDUTY0. The only difference in the handling of 201 to 205 and 206 to 210 is the fact that 5% is substracted in 207 from base control duty BASEDUTY0. This is the amount of correction to prevent WG from opening in the case where the VN base control duty table lags to the VN-closing side due to the setting lag in the VN control, or due to the deviation in the parts. A learning amount LEARNVN is added to the WG side in the same way in 208. This LEARNVN computation will also be discussed later. Here, for example, the base control duty for VN and WG may be obtained from the table shown in FIG. 11(C) stored in ROM memory as a unidimensional look-up table, which is prepared from the base control duty as characteristics shown in FIG. 11(A) and FIG. 11(B). Note that in FIG. 11(C) in items for VN, H is shown in hexadecimal.

FIG. 11(A) and FIG. 11(B) are now detailed. As previously discussed, it can be shown that the supercharging pressure in the low velocity operating region can be determined as the ratio between the cross-sectional area A of the scroll section and the radial distance R from its center, A/R, and, even in the low-speed operating range where the volume of exhaust gas is low, if it is possible for A to be low, it is possible for the turbine RPM to be high which accelerates the increase in the supercharging pressure. Accordingly, by providing a variable geometry means in the turbocharger to vary the A/R ratio of the turbine, an adequate supercharging pressure, and therefore torque, is obtained with this variable-geometry- type turbocharger, even in the low velocity operating region.

For supercharging pressure control using this turbocharger, an actuator is provided which drives the turbocharger's variable geometry means using the supercharging pressure downstream from the compressor as the operating pressure. The supercharging pressure can be rapidly increased by variably controlling the A/R of turbine by controlling the duty of a solenoid valve which allows the operating pressure to escape externally. The control characteristics of this type of solenoid valve are shown in FIG. 11(A). The horizontal axis is the intake air volume and the vertical axis is the value of the base control duty. When this duty, which indicates the valve opening period per fixed period, is 100%, this signifies that the solenoid valve is wide open. In this case, through the variable geometry means, the actuator A becomes a minimum and the turbine RPM is increased. Also, when the duty is 0 percent, the solenoid valve closes completely, and in this case A becomes a maximum and the turbine RPM is suppressed. In this way the supercharging pressure is rapidly increased before the supercharging pressure is controlled at a uniform value by additionally using the exhaust bypass valve control through the exhaust bypass valve means to allow the exhaust gas escape out.

Feedback control is carried out based on the actual detection value in actual practice to eliminate the control lag which accompanies a large variety of deviation factors. Also, in this example, the feedback correction value is obtained from the difference between the actual supercharging pressure, which was detected by a supercharging sensor pressure, and the target supercharging pressure, and correction for the base control duty is made using this value.

Now referring again to FIG. 6(A), in 211, feedback correction is computed for the lags between the actual supercharging pressure P2 and the target supercharging pressure P2ADAPT, and added to the previously obtained feed forward control value. The final control signal values BASEDUTY0 and BASEDUTY1 are thus respectively obtained. The feedback control P2FBCONT carried out in 211 will be discussed later.

In 212, overshoot prevention is carried out at the initial stage of fast acceleration, along with fail-safe handling when problems occur in the component parts. Overshoot prevention handling is explained as follows. When a fast acceleration takes place, the supercharging pressure abruptly rises. In the case of a turbocharger equipped with a variable geometry means, an overshoot is produced as shown in FIG. 17 because the rise in supercharging pressure is rapid as compared with a normal supercharger. In the example shown in this diagram especially, the supercharging pressure at time of overboost control will exceed 500 mg Hg, which would adversely affect the life of the engine. In order to prevent this at the start of the fast acceleration, the WG control duty (control signal) is made temporarily small, and by increasing the amount of exhaust gas which bypasses the turbine 37 and escapes, the supercharging pressure is reduced. In more detail, the control duty correction of the WG control is carried out by means of the supercharging pressure shown in FIG. 13. Specifically, in the case where the supercharging pressure rises as a result of fast acceleration, the WG control duty is reduced 50% when the fixed supercharging pressure P0 is exceeded. However, when the P0 level is set low (for example, 375 mm Hg) to prevent overshooting, the subsequent supercharging pressure becomes low, so that the reduction in control duty lasts only 0.3 seconds at the P0 slice level from the point when the supercharging pressure has reached P0. After 0.3 seconds, with P1 to P3 (>P0) as the slice level, the usual fail safe procedures are carried out by which the WG control duty is compensated by stepwise reduction.

In addition, in consideration of the case where WG does not open, when a condition continues such that P4 is exceeded, the engine control system sets the fuel cut request flag to carry out a fuel cut. Then the last obtained WG, VN control duties are output to each of the previously described solenoid valves 77, 57 through an output interface, after they are moved to ONDUTY1 and ONDUTY2, which will be described later. Overshoot countermeasures and fail-safe procedures are carried out by correction ONDUTY1 and ONDUTY0.

Figure 7A:
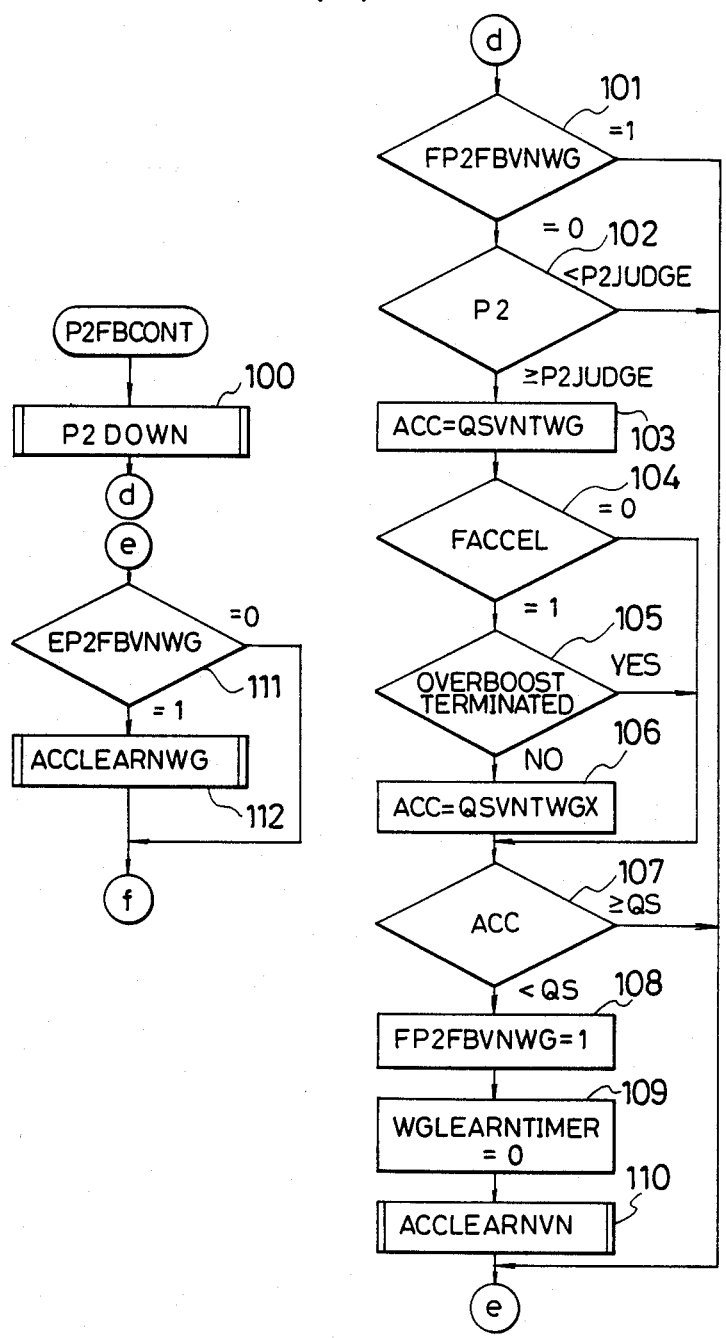
Figure 7B:
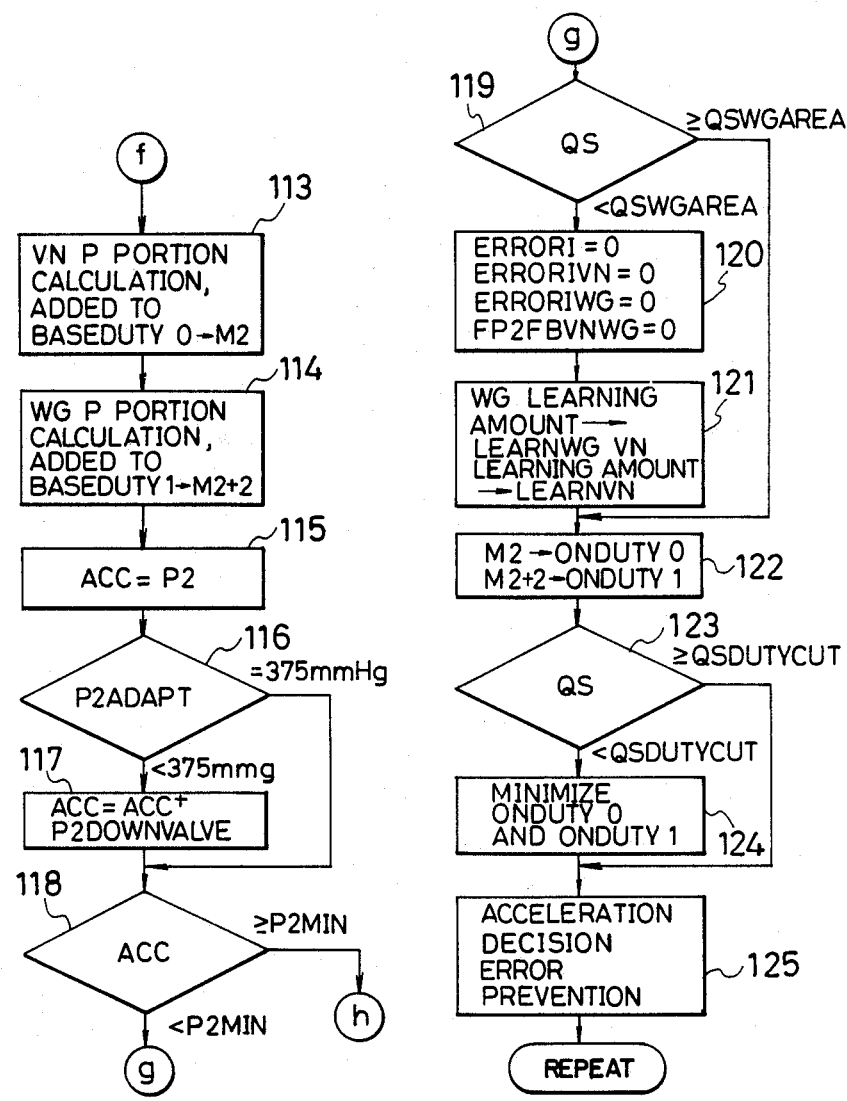
Figure 7C:
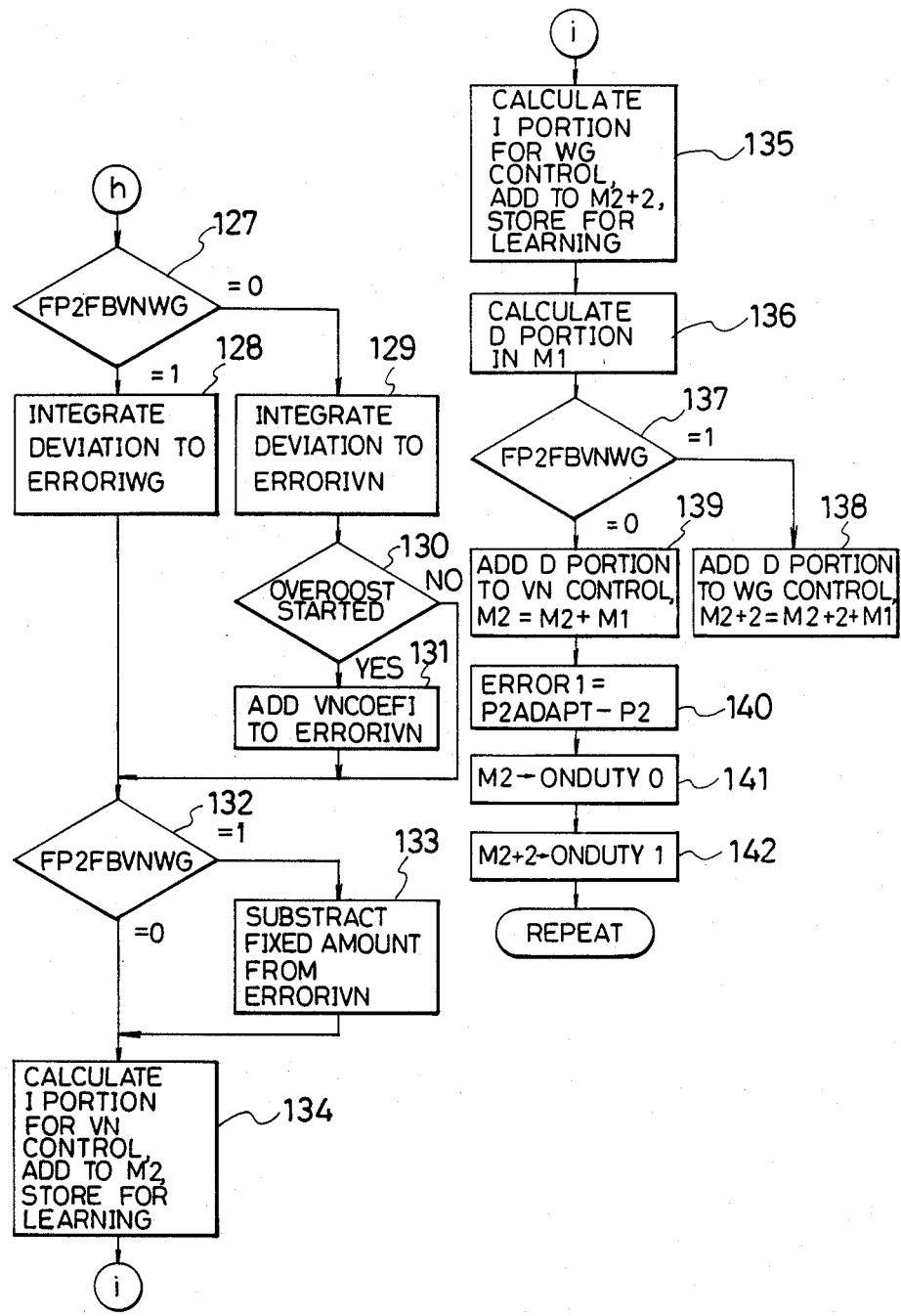

Next, the handling of feedback control P2FBCONT, which is carried out at 211, is described with reference to FIG. 7(A) to FIG. 7(C). Here, an operating region decision or discrimination is made as to whether to carry out feedback control at either VN or WG, and both the feedback correction volume and learning volume are computed. Finally, the controlled variable is stored in ONDUTY0 and ONDUTY1.

The program will now be described. At 100, procedures are carried out to reduce the control target value P2ADAPT in the case where the intake air flow rate is large, in order to avoid abnormal combustion. For example, a one dimensional table, such as shown in FIG. 12(A) is stored in a ROM memory for future reference, and when the intake air flow rate QS is greater than a fixed intake air, flow rate QSPDOWN0, the control target value is gradually reduced. At 101, a flag FP2FBVNWG, which shows whether the VN side or the WG side is the control region, is checked, and if it is "1", the decision is made to apply feedback control to the WG side, and the program advances to 111. If the flag is "0," the program advances to 102 and the following steps, wherein a computation is made to decide the operating region where the feedback control is carried out, and the amount of learning is calculated.

First, at 102, the actual supercharging pressure P2 is checked to see whether it is small, using the region deciding supercharging pressure P2JUDGE (230 mm Hg) which decides the operating region in which the feedback control is carried out. If it is small, the process proceeds to 111 without deciding the operating region. This is to prevent feedback control from being switched to the WG side or control before entering overboost control after a fast acceleration decision, which will be explained later. Specifically, in overboost control, a fast acceleration decision is carried out by means of a comparison between the acceleration period, in which the supercharging pressure goes from 100 mm Hg to 200 mm Hg, and the decision standard TJUDGE. In the case where the acceleration period is smaller than TJUDGE, this is judged to be fast acceleration. However, in the case where the supercharging pressure P2 is also smaller than P2JUDGE, if the abovementioned operating region discriminating is carried out, the fast acceleration decision requires a comparison as explained later between an intake air volume QS and the feedback control region discriminating airflow QSVNTWG to decide which side or control, VN or WG, assumes to feed back control. Accordingly, fast acceleration is decided, and at the point where overboost control (which heightens the responsiveness when fast acceleration is present) is carried out, when the intake airflow is larger than QSVNTWG, this is determined to be in the WG control region. This means, therefore, that feedback control is switched from the VN side to the WG side regardless of the of fast acceleration, and overboost control cannot be carried out. In order to prevent this, the abovementioned decision is not carried out when the supercharging pressure P2 is smaller than P2JUDGE.

In 103, the air flow rate QSVNTWG, which is used to decide the feedback control region during normal operation, is stored in the register ACC. This region decision airflow rate QSVNTWG is the air flow rate line A shown in FIG. 16. Specifically, in this drawing, the region on the left side of line A is the Vn control region, while the right side is the WG control region. In 104, a check is made for the existence of fast acceleration, and when the flag FACCEL is "1", it is judged to be fast acceleration so the process proceeds to 105. On the contrary case, the process proceeds to 107. This flag FACCEL is the fast acceleration decision flag which is set to "1" when fast acceleration is decided, and will be explained later under acceleration decision procedures. At 105, a check is made to see if overboost control has been completed. In the case where the decision is made that overboost control is still being performed, the program proceeds to 106. If overboost control has been completed, the program proceeds to 107. At 106, the region decision airflow rate QSVNTWGX during overboost control (>QSVNTWG) is stored in ACC. This regional decision airflow QSVNTWGX is the air flow rate line B shown in FIG. 14. Specifically, during overboost control, the VN control region expands, so that, to confirm, the region decision airflow rate is increased from line A to line B.

At 107, the region decision airflow rate stored in ACC is compared with the actual intake airflow rate QS. If QS is larger than ACC, the decision is made that this is not a VN control region, and at 108 the flag FP2FBVNWG is set to "1". This means that a switch is made from the VN control region to the WG side. At 109, a timer for initiating the WG learning control is started, and, the same time, at 110, the VN learning amount computation ACCLEARNVN is performed. This learning amount computation will be explained later. At 111, the flag FP2FBVNWG is checked. If it is "0", the program proceeds to 113. If "1", the WG learning amount computation ACCLEARNWG is performed at 112. This learning amount computation will be explained later. In this way, the operating region which carries out the feedback control shown in FIG. 16 is decided, and the computation of the learning amounts for VN and WG is carried out.

Next, at 113 and on, the feedback correction for VN and WG is computed. Here, proportional plus integral plus derivative control is discussed. The proportional, integral, and derivative portions calculated from the deviation will be referred to as the P, I, and D portions respectively. First, at 113, the P portion for the VN control is calculated and added to the previously obtained BASEDUTY0, and the result stored in memory M2. This P portion calculation is obtained by the following computation in consideration of the case where the control stability as well as the base control duty BASEDUTY0 have lagged. Specifically, the P portion for VN control is KPVN×ERROR×|ERROR|. Here, ERROR is the difference between the target supercharging pressure and the actual supercharging pressure (ERROR=P2ADAPT−P2). KPVN is the computed gain. At 114, in the same way, the P portion for the WG control is calculated and added to the previously obtained BASEDUTY1, and the result stored in memory M2+2. The P portion for the WG control is KPWG×ERROR, where KPWG is the computed gain. In FIG. 15, the P portion for the VN control is shown by the dotted line, while that for the WG control is shown by the solid line.

The P portions of the feedback control obtained in this manner are usually added. However, in order to perform integral and derivative control at a pressure above a fixed supercharging pressure, the decision is made in the steps from 115 to 118 whether or not integral and derivative control is carried out. First, at 115, the actual supercharging pressure P2 is stored in register ACC. At 116, a check is made to see whether the target supercharging pressure P2ADAPT is 375 mm Hg. When P2ADAPT is 375 mm Hg, the process proceeds to 118. If P2ADAPT is less than 375 mm Hg, P2DOWNVALUE is added to ACC at 117. In the case where the supercharging pressure reaches P2MIN (320 mm Hg), a decision is made at 118 as to whether integral and derivative control are possible. This is because at 100, in the case where the air flow rate becomes high, and the control target value drops, a decision is made that control is possible from a lower supercharging pressure. Specifically, in the low and medium air flow range where the control target value is 375 mm Hg, a decision is made by comparing the actual supercharging pressure and the decision supercharging pressure P2MIN (320 mm Hg), as to the control region where integral and derivative control is carried out. However, in a high air flow region where the control target value is less than 375 mm Hg, it is desirable to also make the decision supercharging pressure P2MIN small, to maintain a control region to carry out integral and derivative control. For this reason, it is acceptable to compare P2, which is stored in the ACC register, with a value obtained by subtracting a fixed value only from P2MIN. However, when the previously mentioned fixed value is added to P2 in advance to compare this added value with P2MIN, the same result is obtained. The fixed value in this case is the previously mentioned P2DOWNVALUE, and P2DOWNVALUE may also be a uniform value and may vary in proportion to QS.

At 118, a check is made to see if ACC is greater than P2MIN. In the case where it is greater than P2MIN, it is decided that control is possible, and the program proceeds to 127. In the case where the decision is made that control is not possible, a check is made at 119 to see whether QS is smaller than a specified air flow rate QSWGAREA. If smaller, all control sequence flags are reset at 120, and the initialization of all feedback variables is carried out at the same time. At 121, the learning quantities for both VN and WG are rewritten. Specifically, the timing which renews the learning quantity occurs when the supercharging pressure is smaller than P2MIN and when the intake air volume is smaller than QSWGAREA. When this is large, in the case where the supercharging pressure has momentarily dropped at the high air flow rate side, the abovementioned flags are not reset, or the abovementioned variables are not initialized, and the program advances to 122. Specifically, in full-open acceleration in the high airflow range in the case where the accelerator pedal is returned to its original state, there are cases where the drop in supercharging pressure proceeds faster than the drop in intake air volume. In a case of this type, a high airflow is maintained, and, in spite of the fact of being in the WG control range, the resulting supercharging pressure is below P2MIN. Accordingly, even in this case, the flags are reset and the feedback variables are initialized, after which the integrated value ERRORIWG (of the deviations up to the last one for the WG control) is subtracted, and the amount of WG control is small, resulting in control lag caused by certain factors such as dispersion in the parts, etc. The flags are not reset to prevent such control lag.

At 122, the values stored in memories M2 and M2+2 (the results of adding the amount of correction to the base control duties) are moved to ONDUTY0 and ONDUTY1. This transfer sets the upper and lower control limits within which the VN and WG values respectively must be controlled. At 123, a check is made to see whether QS is smaller than the decision airflow rate QSDUTYCUT. If it is smaller, the control duties ONDUTY0, ONDUTY1 are set to minimum values at 124. This action is taken to increase the durability of control solenoid valves 57, 77 by preventing them from activating at low airflow rates when idling. At 125, action is taken to prevent acceleration decision errors. An explanation of this action is later described under acceleration decision action. After this, the program proceeds to 212 under VNWGCONTROL.

Next, at 118 a decision is made as to whether this is a region where integral and derivative control is possible. The case where the program proceeds to 127 will now be explained. Proceeding from 127, the respective computations for VN and WG are made, based on the result of the decision as to whether this is a control region for VN and WG (carried out in 101 to 106). First, at 127 a status check is made for the flag FP2FBVNWG. If it is "1," the present deviation ERROR is added to ERRORIWG, the accumulated value of deviation ERROR for WG up to the last one. If the flag is set st "0," the program proceeds to 129 where the present deviation ERROR is added to ERRORIVN, which is the accumulated value of deviation ERROR for VN up to the last one. At 130, a check is made for the start of overboost control. In the case where the decision is made that overboost control has started, the amount of correction VNCOEFI at the time of overboost control is added to ERRORIVN at 131. This adds the amount of feedback control which is the amount of increase over the target value when overboost control is performed. In the case where overboost control has not started, the program proceeds to 132 where FP2FBVNWG is checked. If "1," this indicates the WG control area, so the program proceeds to 133 where a fixed value is subtracted from the integrated value ERRORIVN of the VN deviation ERROR. As a result, after the feedback control is switched from the VN control to the WG control, the amount of VN control is gradually subtracted from the amount of control immediately before the switch. Specifically, even after the feedback switches to the WG control, on maintaining the VN control at the amount immediately before the switch, along with the increase in the amount of exhaust gas flow, the flow velocity in the introductory channel 40 increases and the pressure drops. As a result of this pressure drop a movable flapper 45 is swung in the direction which closes the introductory passage 40, and the capacity of the turbocharger is reduced. On the other hand, when the fixed value is subtracted from ERRORIVN, that is the accumulated value of the VN deviation ERROR, the movable flapper 45 is swung in the direction which opens the introductory passage 40. The passage 40 is completely opened, so that even when WG control is entered, a sufficient volume of exhaust gas can be maintained, and the turbocharger is able to demonstrate maximum restriction performance. However, in the case where FP2FBVNWG is "0," the program proceeds to 134 where the I portion of the VN control is obtained from the calculation KIVN×ERRORIVN, and this is added to M2. Here, KIVN is the computed integrated gain. In addition, at the same time this I portion is stored in VNLEARN as the present VN learning amount for learning control. At 135, the I portion is obtained for the WG side from the calculation KIWG×ERRORIWG and added to M2+2. Here, KIWG is the computed integrated gain. At the same time this I portion is stored in WGLEARN as the present WG learning amount for learning control. At 136, the D portion is calculated and that result is stored in memory M1. This D portion is obtained from the calculation KDX (ERROR1−ERROR). Here, KD is the computed derivative gain. Specifically, a check is made in FP2FBVNWG to see whether the control is at the VN or the WG side. If it is in the VN control region, the VN gain, KDVN, is selected and calculated. If in the WG region, then the WG gain, KDWG, is calculated. ERROR1 is the previous ERROR. At 137, when FP2FBVNWG is "1," the D portion for the WG control is added to the WG control at 138, and the resulting sum is stored in M2+2. If "0," the D portion for the VN control is added to the VN control at 139, and the resulting sum is stored in M2. At 140, the present error ERROR (=P2ADAPT−P2) is stored in ERROR1 in order to calculate the D portion obtained in the next computation. At 141 and 142, the values stored in memories M2 and M2+2 (the result of adding the amounts of correction to the base control duties) are moved to ONDUTY0 and ONDUTY1 as the final control duties. This transfer sets the upper and lower control limits within which the VN and WG values respectively must be controlled. After this, the program proceeds to 212 VNWGCONTROL.

Figure 6B:
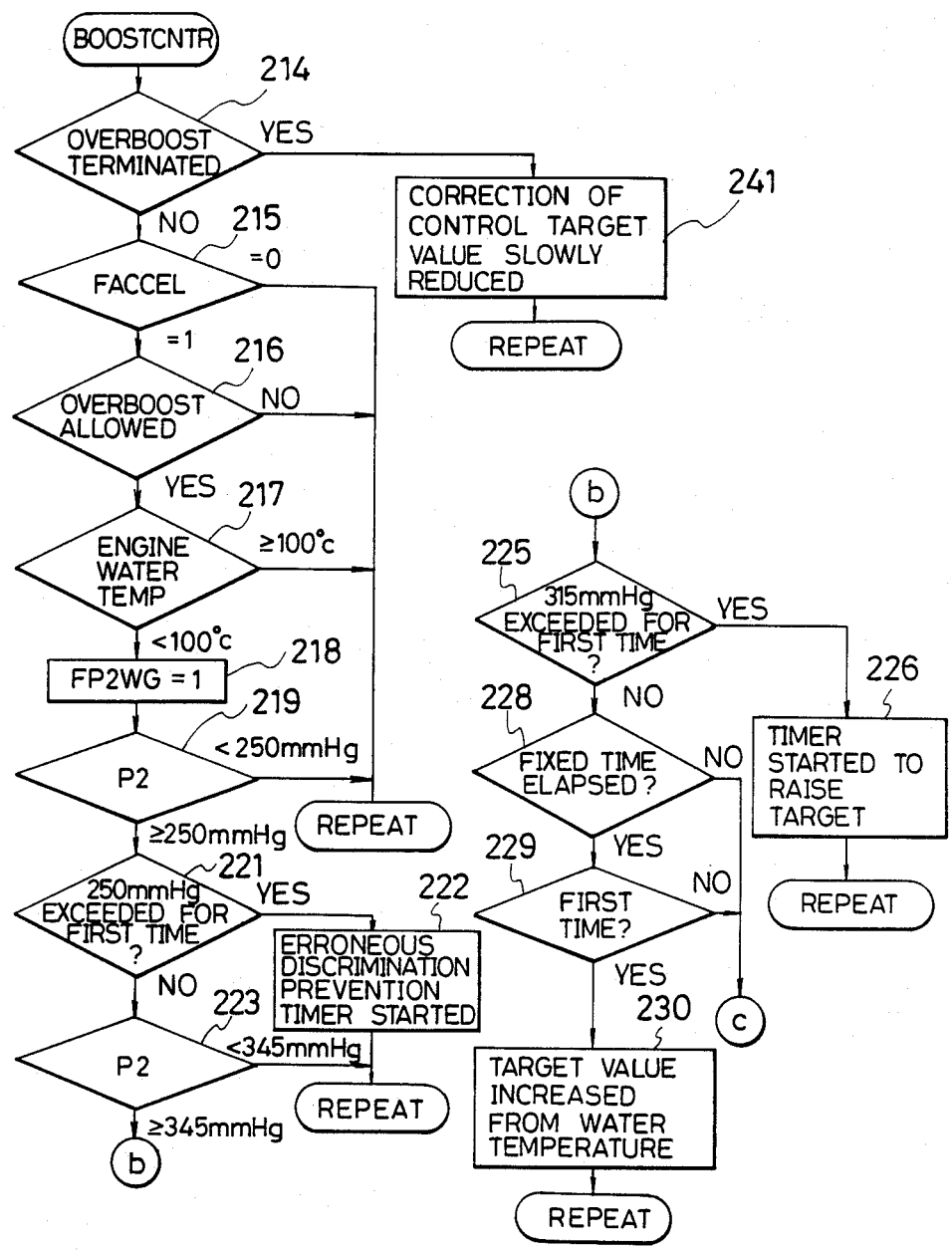
Figure 6C:
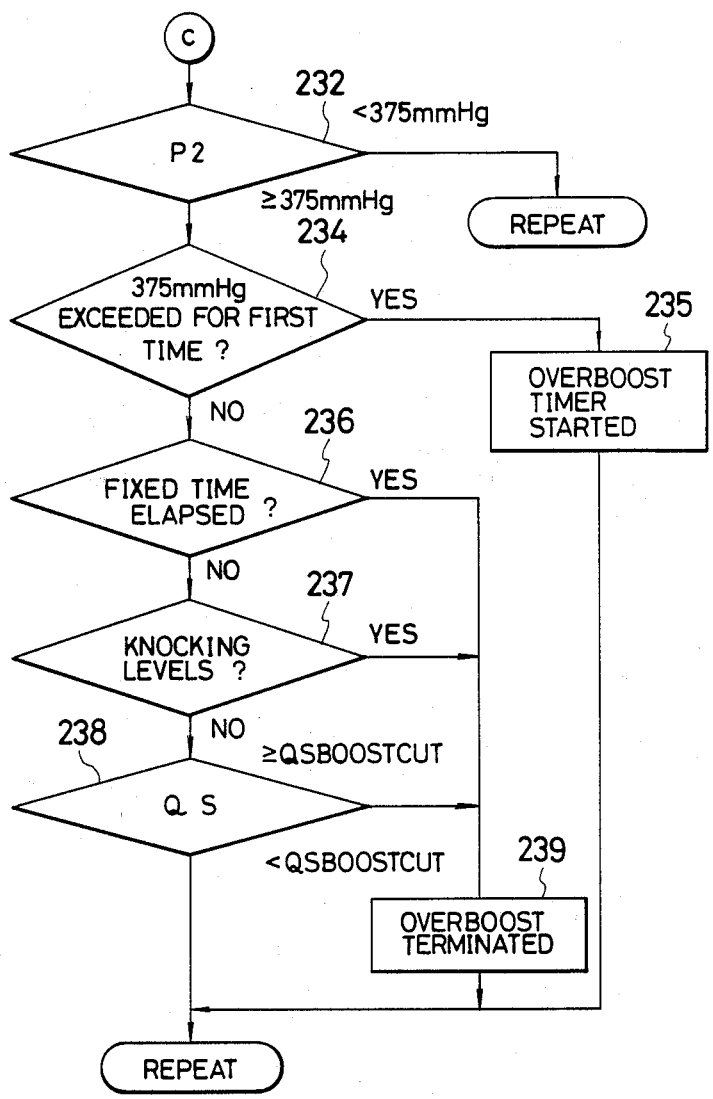

Next, an explanation will be made of overboost control provided when fast acceleration occurs, by which the supercharging pressure is temporarily elevated, and acceleration performance is upgraded. Basically, the previously mentioned feed forward control quantity is modified, and overboost control is executed by elevating the control target value. FIG. 6(B) is a flowsheet showing the action of a program BOOSTCNTR which carries out the setting and resetting of the various flags for overboost control. FIG. 8(A) is the flowsheet for the program ACCELJUDGE which judges fast acceleration.

First the explanation will be made following the order in FIG. 8(A) in judging fast acceleration. This action is executed every 10 ms, apart from the control computation previously explained. At 300, the supercharging pressure is stored in P2. At 301, a check is made to see if P2 exceeds 100 mm Hg. If it does not exceed 100 mm Hg, the flags and the variables used in the control sequence are reset and initialized, respectively, at 302. If P2 is greater than or equal to 100 mm Hg, the program proceeds to 303. If it is the first time that 100 mm Hg has been exceeded, the program proceeds to 304, and a timer for measuring acceleration time is started. At 305, the time is computed as decision criteria from the engine RPM at 100 mm Hg, gear position, etc., and this is stored in TJUDGE. This decision criteria becomes the decision line shown in FIG. 14(B), specifically, the decision line obtained from $$\frac{156,250 \ (\times 10 \ \text{ms})}{\text{Engine RPM at 100 mg. Hg}}$$

If the acceleration time ($\tau$) which will be later explained, is in a region below this decision line, this is judged to be fast acceleration. The numbers in FIG. 14(B) show the gear positions from speed 1 to speed 4. Up to speed 3 these are grouped under the decision line so that there is no problem, but at speed 4, at low RPM, the acceleration times ($\tau$) (the times from a supercharging pressure of 100 mm Hg to 200 mm Hg) exceed the decision line and are distributed in the region shown enclosed by the dotted line in the diagram. Accordingly, at the low RPM region of speed 4, it is necessary to move the decision line to a location where this region is exceeded, and the decision criteria is taken as the value obtained by adding a fixed value to the value of the decision line. This is the reason that the gear positions in the transmission are also considered as decision criteria.

At 303, in the case where 100 mm Hg has been exceeded by twice or more, the program proceeds to 307 where a check is made to see whether P2 has exceeded 200 mm Hg. If P2 is smaller than 200 mm Hg, this is judged not to be fast acceleration. If P2 is equal to or greater than 200 mm Hg, the timer value started at 304, specifically the acceleration time ($\tau$) shown in FIG. 14(A) (as previously stated, the times from a supercharging pressure of 100 mm Hg to 200 mm Hg), is checked to see whether it is smaller than the decision criteria TJUDGE determined at 305. If smaller, the program proceeds to 309, and the flag FACCEL is set to "1" showing that this has been judged as fast acceleration. After this, the program returns to engine control action. In this way the input of supercharging pressure and the judgment of fast acceleration conditions necessary for control are performed. This data is used in VNWGCONTROL in FIG. 6(A), and P2FBCONT in FIG. 7, which were discussed previously, and in BOOSTCNTR in FIG. 6(B), which will be explained next.

Next, the BOOSTCNTR procedure for appropriately performing overboost control will be explained with reference to FIG. 6(B). This BOOSTCNTR is executed once, prior to executing VNWGCONTROL, and provides the data necessary for overboost control. Following the sequence in FIG. 6(B), first, a check is made at 214 to see if overboost control has been completed. This is carried out by checking the results of the actions to complete overboost control which are performed in procedures 236 to 239 described below. Once the decision is made that this control has been completed, the program proceeds to 241, and action is carried out to perform a gradual reduction to the control target value (action which gradually reduces the amount of feed forward control during overboost control). If this control has not been completed, the program proceeds to 215, where a check is made of the fast acceleration decision flag FACCEL which is set or reset by the previously discussed fast acceleration decision action. If "0," the action has been completed. If "1," this is judged to be fast acceleration, and the program proceeds to 216 where a check is made to see if overboost control is permitted. Whether or not overboost control can be performed depends on the engine and type of vehicle. For example, by storing this information in ROM memory, the same program can cope with different specifications such as those which have overboost control and those which do not.

In the case where overboost control is permitted, the program proceeds to 217 and a check is made to see if the temperature of the engine cooling water is below 100 deg C.

If 100 deg C. or higher, it is easy for abnormal combustion to occur, so overboost control is not performed. If below 100 deg C., the program proceeds to 218, and the WG feed forward correction start flag FP2WG is set at "1". At 219, a check is carried out to see if the supercharging pressure exceeds 250 mm Hg. If not exceeded, the action is complete. If exceeded, the program proceeds to 221. The first time 250 mm Hg is exceeded the program proceeds to 222 where the fast acceleration decision error prevention timer is started and the VN feed forward correction start flag FP2VN is set to "1." The measured time of this decision error prevention timer is checked by the fast acceleration decision error prevention procedures previously described at 125 in FIG. 7. In the case where 250 mm Hg. is exceeded and 320 mm Hg is reached for more than 3 seconds, this is judged not to be fast acceleration, and the fast acceleration decision flag FACCEL and the VN feed forward correction start flag FP2VN are reset to "0." This is to prevent the deterioration of operability which occurs under the following conditions. Upon acceleration from the point of the throttle valve being opened ¼ at the second speed transmission gear position shown in FIG. 18, the time ($\tau$) used in the fast acceleration decision is short. Consequently, the fast acceleration is identified, since the acceleration time is short, overboost control is entered after the completion of acceleration, and the supercharging pressure quickly changes, so that the operability deteriorates.

Specifically, from 250 mm Hg to 320 mm Hg, in the case where the time To measured by the decision error prevention timer is greater or equal to 3, this is not considered as fast acceleration. Next, at 221, in the case where 250 mm Hg is exceeded for the second or subsequent time, the program proceeds to 223, and a check is made to see if the supercharging pressure P2 has exceeded 345 mm Hg. If 345 mm Hg is exceeded, the program goes to 225 and a check is made to see if 345 mm Hg is exceeded for the first time. In the case where it is exceeded for the first time, the program proceeds to 226, a timer is started to measure the amount of time spent above the control target value, and the action is terminated. At 225, in the case where 345 mm Hg is exceeded for the second or subsequent time, the program proceeds to 228, and at 226, a check is made to see whether a fixed time period (0.3 sec) has been recorded on the timer which was previously started. If that time has elapsed, the program proceeds to 229. If this fixed time has elapsed for the first time, the program proceeds to 230 and an amount of overboost control corresponding to the water temperature of the engine is applied, and the control target value is elevated. Specifically, the optimum overboost controlled variable corresponding to the water temperature is obtained from the one-dimensional table, as shown in FIG. 12(B), and optimum overboost control is obtained because the control target value 425 mm Hg decreases as the water temperature gets higher (a fixed quantity is added for reduction).

Next is the case where the program proceeds from 228 and 229 to 232 and on, where from 232 on, a check is made of the overboost control terminating conditions. Specifically, at 232 and 234, in order to measure the elapsed time from when the supercharging pressure exceeds 375 mm Hg, in the case where 375 mm Hg is exceeded for the first time at 234, the program proceeds to 235, and the timer for measuring overboost control time is started. At 234, when 375 mm Hg has been exceeded for the second or subsequent time, the program proceeds to 236, and a check is made to see if the timer for measuring control time, which was started at 235, has exceeded a fixed elapsed time. If this time has been exceeded, the program proceeds to 239 and overboost control is terminated. If not exceeded, the program proceeds to 237, and the knocking level is checked. If the knocking level is large, the overboost control is terminated so that knocking will not be produced. If the knocking level is small, the program proceeds to 238 and a check is made to see if QS is larger than the decision air volume QSBOOSTCUT which cuts the overboost control. If QS is larger, the program proceeds to 239 and the overboost control is terminated to avoid producing abnormal combustion. In this way, the various types of data processing for overboost control are carried out in the BOOSTCNTR actions.

Next, learning control, by which correction is made for the lag in the amount of VN and WG feed forward control, will be explained. With learning control, the amount of feedback correction is taken as the amount of learning, and the amount of feedback correction becomes closer to that obtained from the true deviation from the control target value in a later time period during feedback control, so that it is in the most delayed time period of the feedback control, specifically, when the feedback control is switched that the most accurate deviation from the control target value is provided. For this reason, in the VN control, 110 in FIG. 7 is the timing which computes the amount of the learning, and it is the time when feedback control is switched from VN to WG. In addition, the amount of learning is the I portion which was stored in VNLEARN at 134 in the same diagram.

Accordingly, this means that the stationary deviation portion, when the supercharging pressure is being controlled at the VN side, is previously added to the amount of feed forward control in the following controls. The actual computation of the learning amount is explained based on FIG. 9. First, at 400, a check is made of FACCEL to see if overboost control is being carried out. Computation of the amount of learning is, of course, possible when overboost control is not being carried out, but, in the case where overboost control is being carried out, the value of the I portion is large in that control region, to expand the VN control region. When control is carried out by means of this large value, the accuracy of the control can be improved, so that in this embodiment the computation of the amount of learning must be carried out immediately after the overboost control. Specifically, in this case, when overboost control is not carried out, rather than calculating the amount of learning, the control accuracy is upgraded along with the responsiveness of the supercharging pressure control. Accordingly, in this example, in the acceleration conditions when overboost control is not carried out, the computation of the amount of learning is not performed. In the case where overboost control is carried out, the program proceeds to 401, and the amount of correction during overboost control (15% of the control duty equivalent) is reduced from the stationary deviation VNLEARN, obtained at 134 in FIG. 7, and the reduced result again becomes VNLEARN. This is to get the optimum base control duty when there is no overboost control. At 402, the value obtained by adding VNLEARN and LEARNVN is stored in VNLEARNVALUE. Here, LEARNVN is the result of the previous learning, and this value LEARNVN is added to the present learning result VNLEARN to obtain an optimum value for the amount of learning. In this way, the newest result of VNLEARNVALUE stored at 121 in FIG. 7 is reflected in the next control, specifically, by the fact that renewal is made when the reset control feedback conditions are satisfied—the supercharging pressure is smaller than 320 mm Hg, and QS is smaller than QSWGAREA. The renewed timing in this example satifies these two conditions but it is acceptable if it is at least smaller than the fixed supercharging pressure.

Next, the WG learning control will be explained. The computation timing of the amount of learning of the WG control must be placed when it is not effect by the VN feedback control, and when the amount of correction from the WG feedback control is sufficiently focussed. In short, immediately after feedback control is switched from the VN side to the WG side, the degree of opening of VN is not yet stabilized, and the correct amount of WG feedback correction cannot be learned. Therefore, consideration must be given to the response lag until VN is completely opened and stabilized and a fixed time elapses after the switch is made. Specifically, the timing which carries out the computation of the amount of learning is at 112 in FIG. 7, when a fixed time has elapsed (1.2 sec) after the feedback control is switched to the WG side. In addition, the amount of learning is the I portion stored in WGLEARN at 135. This means that the normal deviation portion when the supercharging pressure is controlled from the WG side is added in advance to the amount of feed forward control in the following controls.

The computation of the actual amount of the learning will now be explained based on FIG. 10. First, at 404, in 109 in FIG. 7, specifically, the calculated value of the WGLEARNTIMER, the timer which starts the WG learning control when the feedback control is switched to the WG side, is checked to see if it has exceeded 1.2 seconds. If it is less than 1.2 seconds, the amount of learning is not computed. If it has exceeded 1.2 seconds, the program proceeds to 405. In the same way on ths VN control, the present stationary deviation WGLEARN, which was obtained in at 135 in FIG. 7, is added to the amount of learning LEARNWG from the previous time, and is stored in WGLEARNVALUE. This newest learning value, with the same timing as the VN side, specifically, is renewed at 121 in FIG. 7. The computation and renewal of the amount of learning are performed at the optimum timing for VN and WG respectively, and these renewed values are added as LEARNVN and LEARNWG at 203 and 208 (FIG. 6(A)) in the procedures VNWGCONTROL, specifically as feed forward control correction.

Figure 8B:
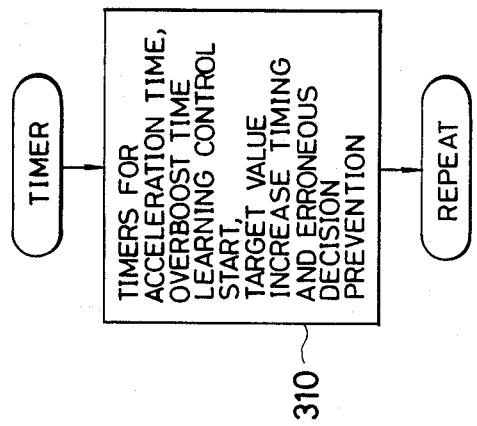
Figure 8A:
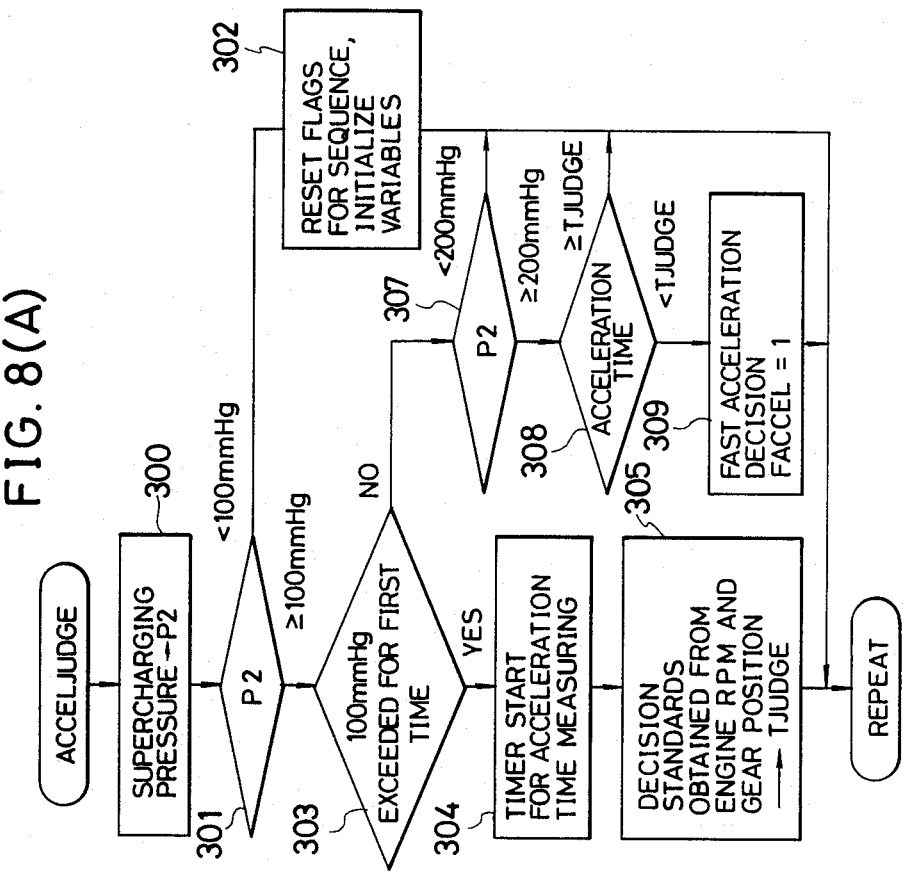

In addition, the timers used for time calculations during the previously outlined explanations, as shown in FIG. 8(B), perform the timing under TIMER procedures by being incremented once every fixed time period (10 ms).

FIGS. 19 and 20 show a comparisn for the operation, function and effect prior to learning (broken line), and after learning (solid line), respectively, in the case where full acceleration is carried out from the third speed, 30 km/hr. This is an example of the case where VN and WG are both set in the direction where the supercharging pressure increases, or where, because of the deviations of the component parts, the supercharging pressure becomes higher both in the VN and WG controls. In this type of example, the engine life is adversely affected. However, as shown in the drawing, with this example or embodiment of the present invention, although the value of the control duty is large prior to learning, and, for this reason, the supercharging pressure greatly exceeds the control target value, the supercharging pressure is controlled to the control target value with a high degree of accuracy after learning (this is the example of the third full acceleration). Furthermore, the region A performs overboost control at a control target value of 425 mm Hg, and in the region B, overboost has terminated after being carried out to a control target value of 375 mm Hg. The slanted line area indicates the difference between before and after learning, while the arrows indicate the magnitude of learning.

Prior to learning, at point S, when full acceleration (first acceleration) commences, the supercharging pressure increases. At this time, rather than beginning to open at point V6, as would normally occur, opening commences from the delayed point V0. However, VN, which maintains the supercharging pressure higher than the control target value, is closed more than the optimum position, so it cannot open completely. Accordingly, when the feedback correction value in this status is learned at the time the feedback control is switched to the WG side, the VN opening degree, which is not completely opened, control is taken as a standard for control under the WG control. For this reason, the exhaust pressure increase and WG begins to open early at the point WO rather than at the point W6 where it would begin to operate normally. The resulting supercharging pressure is controlled at a higher value than the control target, which has an adverse effect on the life of the engine. In addition, because the supercharging pressure control is carried out with VN unable to open fully, the A/R ratio of the turbocharger becomes extremely small. The turbine efficiency drops, and acceleration performance deteriorates.

On the other hand, when the same acceleration is repeated after learning (sixth acceleration), the amount of feed forward control for the five previous accelerations is learned, and the supercharging pressure is controlled to the target value with a high degree of accuracy. For this reason, it is possible to absorb the setting lags and control lags with component changes over time or variations in components, all of which have an adverse effect on the life of the engine because of the supercharging pressure being higher than the control target value, or which cause a deterioration in acceleration performance because this pressure is lower than the target value. It becomes possible to apply optimum control in all operating ranges. After acceleration commences at the point S, VN begins to open from point V6 with good response and opens almost completely (A/R maximum). (In this case WG begins to open from point W6). Because the turbine efficiency is maintained at a high level accompanying an improvement in responsiveness, the acceleration performance can be increased. In addition, because the usual deviation is abolished by the learning process, strict control of the accuracy of parts assembly is no longer essential, so adjustments at the factory can be reduced.

In addition, similar functions and results can be obtained in learning control on the VN control.

Following is an explanation of the relationship between the VN control duty and the airflow rate with reference to the embodiment of FIG. 3. FIG. 21 is a characteristic diagram showing a comparison between the VN control duty when overboost control is being applied and when it is not. As shown in this diagram, during overboost control, the region deciding airflow volume which switches control from the VN side to the WG side moves from A (QSVNTWG) to B (QSVNTWGX), and by this means the control region on the VN side is expanded. Incidentally, the difference between the curved lines in the direction of the vertical axis shows the previously mentioned amount of acceleration correction.

FIG. 22(A) is a graph showing the action and effect in the case where full acceleration is carried out from the 4th speed 40 km/hr in actual practice, on the basis of this type of control duty. In this graph, the horizontal axis shows the elapsed time from the point where the throttling valve is full open, while the vertical axis shows, respectively, the supercharging pressure (compressor output pressure), the VN control duty (base control duty plus actual control duty), the opening degree or amount that VN is open, airflow rate index, and the amount that WG is open. The base control duty is equivalent to the value for BASEDUTY0 from the table look-up at 206 in FIG. 6(A). The actual control duty corresponds to the value stored in ONDUTY0 in FIG. 7.

At point T0, the accelerator pedal is depressed and acceleration starts, upon which the supercharging pressure rises. At point T1, specifically where the supercharging pressure reaches 320 mm Hg, VN and WG are controlled at the actual control duty for which the P portion has been added to the base control duty corresponding to QS. In this region the P portion is a comparatively large positive value, and the base control duty is also a large value, so that this total becomes close to 100% of the upper control value. The VN opening is made small (WG is completely closed) and control is carried out so that the supercharging pressure rises to the control target value as far as possible. If point T1 is exceeded, VN enters the control region at which feedback control is carried out, so that VN is controlled at the actual duty (the total of base control duty + P portion + I portion + D portion) which has the I portion and D portion further added. However, in the case where overboost control is carried out resulting from a fast acceleration decision, the region decision airflow volume, where the control is switched from the VN side to the WG side, is shifted from QSVNTWG (QS value at 02EH) to a large value of QSVNTWGX (QS value at 048H), and the VN control region expands. For this reason, during overboost control, VN is controlled at a value corresponding to the deviation from the actual supercharging pressure so that this value becomes the objective supercharging pressure during overboost control. Specifically, the value of the actual control duty on the VN side is large, and as a result of this large value, the VN opening is kept small, and it is possible to reach a supercharging pressure (425 mm Hg) which becomes the objective during overboost control. As a result, during overboost control, as the result of an objective supercharging pressure which is higher than during normal operation, the engine output is high, and, because of this, the acceleration performance can be improved. The increase in the objective supercharging pressure is carried out at the point T2 where the actual supercharging pressure is 375 mm Hg.

Next, at point T4 where the overboost control terminates to switch to normal operating status, the region decision airflow volume goes from QSVNTWGX to QSVNTWG once again. In this status, the actual airflow rate exceeds QSVNTWG so that the switch is made immediately in the control region which carries out feedback . control on the WG side, and feedback control is removed from the VN control. Specifically, the actual control duty of the VN side after the switch, becomes the value of the P portion only added to the base control duty. However, in this status, because the supercharging pressure becomes almost the same as the target supercharging pressure, the deviation almost disappears (the P portion is small), and the actual control duty comes close to the value of the base control duty. For this reason, the VN opening degree gradually becomes large, corresponding to the decrease in the actual control duty value, and the turbine volume becomes large. After this, at the time when the VN becomes wide open, the supercharging pressure is controlled to the control target value, by means of the WG opening.

In FIG. 22(B), the operation and effect are shown of the case where full acceleration is carried out from the 4th speed 80 km/hr. The action and the effect from the expanding of the control region on the VN side can be obtained in the same way from FIG. 22(A), Next, in order to make a comparison with this embodiment of the present invention, FIGS. 23(A), 23(B), 24(A), and 24(B) show actual test results carried out at identical operating conditions by another method. FIGS. 23(A) and 24(A) correspond to FIG. 22(A), while FIGS. 23(B) and 24(B) correspond to FIG. 22(B). Now referring to FIG. 23(A) and FIG. 23(B), this is an example in which the value of QSVNTWG is simply taken as a value larger than the one in the previous embodiment (QS value at 034H) in order to delay the switch of feedback control from the VN side to the WG side. In this example, in a fast acceleration period from a low load (4th speed, full acceleration from 40 km/hr) overboost control is also taking place in the VN control region, so that the target supercharging pressure can be reached during overboost control. However, in a fast acceleration period from a high load (4th speed, full acceleration from 80 km/hr), due to the original large air volume, the switch is made at initial acceleration to the WG control region (switched to QSVNTWG). For this reason, at the VN control, which is removed out of feedback control, the control duty value quickly becomes small, so that VN reaches the fully open stage during overboost control, and the objective supercharging pressure (425 mm Hg) cannot be reached.

FIG. 24(A) and FIG. 24(B) illustrate an example in which QSVNTWG is the same value as in FIG. 23(A) and FIG. 23(B) (QS value at 034H), and at the same time, the actual control duty for VN is fixed at a uniform value from the point where it becomes QSVNTWG to QSVNTWGADD (QS value at 040H), so that VN does not completely open during overboost control in fast acceleration from a high loading. In this example, in fast acceleration form a high load, VN is maintained in a slightly open status so that A/R is small, and the target supercharging pressure (425 mm Hg) can be reached during overboost control. The supercharging pressure control after the target supercharging pressure is reached becomes inpossible for VN with a fixed control duty, so that a change is made and control is carried out on the WG side, and WG quickly opens. Specifically, if the VN opening is fixed and remains small, that the turbocharger efficiency is reduced, and the exhaust pressure becomes extremely high so that the engine output drops.

In this embodiment of the present invention, the inconveniences seen in these examples are not produced, and, as previously discussed, during overboost control, the turbocharger efficiency does not drop. During overboost control the target supercharging pressure can be reached, and acceleration performance can be improved.

What is claimed is:

1. An apparatus, comprising:
   an exhaust turbine having an inlet for receiving exhaust gas from an operating system, said inlet having a cross sectional area,
   a compressor powered by said exhaust turbine for supplying a supercharging pressure to said operating system,
   a variable geometry means for adjusting the cross sectional area of said inlet to said exhaust turbine,
   an exhaust bypass valve means for providing an exhaust path bypassing said exhaust turbine,
   an operation detecting means which detects operating conditions of said operating system,
   a supercharging pressure detecting means which detects said supercharging pressure,
   a deviation calculating means which calculates a deviation between the detected supercharging pressure and a target supercharging pressure and provides an integrated value of said deviation,
   a controlled variable determination means which determines a controlled variable for actuating at least one of said variable geometry means and said exhaust bypass valve means based on said operating conditions,
   a feedback correction means which operates to perform feedback correction of said controlled variable in accordance with a previously determined learning amount and said integrated value of said deviation to produce a corrected controlled variable,
   a control means which controls at least one of said variable geometry means and said exhaust bypass valve means in accordance with said corrected controlled variable,
   an operating range discriminating means which determines an operating range in which feedback control of said at least one of said variable geometry means and said exhaust bypass valve means is to be performed, and
   a learning amount calculating means which calculates a new learning amount in relation to at least one of said variable geometry means and said exhaust bypass valve means in accordance with the result of the operating range determining made by said operating range discrimination means and said integrated value of said deviation, so that the controlled variable is corrected in future operations of said feedback correction means based on said new learning amount used as said previously determined learning amount.

2. An apparatus, comprising:
   an exhaust turbine having an inlet with a cross section for receiving exhaust from an operating system,
   a compressor driven by said exhaust turbine for providing a supercharge pressure to said operating system,
   a variable geometry means for changing the cross section of said inlet to said exhaust turbine,
   an exhaust bypass valve means for providing an exhaust path bypassing said exhaust turbine,
   an operation detecting means which detects operating conditions of said operating system,
   a supercharging pressure detecting means which detects said supercharging pressure,
   a deviation calculating means which calculates a deviation between the detected supercharging pressure and a target supercharging pressure and provides an integrated value of said deviation,
   first and second controlled variable calculating means for calculating first and second controlled variables for operating, respectively, said variable geometry means and said exhaust bypass valve means in accordance with said detected operating conditions,
   first and second feedback correction means which correct said first and second controlled variables in accordance with said integrated value of said deviation and in accordance with a previously determined learning amount to provide first and second corrected controlled variables,
   first and second control means which control said variable geometry means and said exhaust bypass valve means in accordance with said first and second corrected controlled variables,
   an operating range discriminating means for determining an operating range in which feedback control is to be performed and selecting whether to perform feedback control of said variable geometry means or said exhaust bypass valve means,
   first and second learning amount calculating means which calculate new first and second learning amounts in relation to the variable geometry means and exhaust bypass valve means, respectively, in accordance with the result of said operating range determination and said integrated value of said deviation, so that said first and second controlled variables are corrected in future operations of said first and second feedback correction means based on said new learning amounts used as said previously determined learning amounts, and
   a means for controlling the timing of said calculation of said new learning amounts to effectively operate said variable geometry means and said exhaust bypass valve means.

3. The apparatus of claim 2, including means for switching feedback control between said variable geometry control and said exhaust bypass valve control based on said selection by said operating range discriminating means, wherein said calculation of the new learning amount of said first learning amount calculating means is performed when feedback control is switched from the variable geometry control to the exhaust bypass valve control.

4. The apparatus of claim 3, wherein said new learning amounts related to said variable geometry means and exhaust bypass valve means are recalculated each time that said supercharging pressure become less than a predetermined supercharging pressure.

5. The apparatus of claim 2, including means for switching feedback correction between said variable geometry control and said exhaust bypass valve control based on said selection by said operating range discriminating means, wherein said calculation of the new learning amount of said first learning amount calculating means is performed when a predetermined time is elapsed after switching the feedback control from the variable geometry control to the exhaust bypass valve control.

6. The apparatus of claim 5, wherein said new learning amounts related to said variable geometry means and exhaust bypass valve means are recalculated each time that said supercharging pressure becomes less than a predetermined supercharging pressure.

7. The apparatus of claim 2, including means for switching feedback correction between said variable geometry control and said exhaust bypass valve control based on said selection by said operating range discriminating means, and further comprising an overboost control means which raises said target supercharging pressure during a predetermined time when sudden acceleration is detected, wherein said calculation of said new learning amount of said first learning amount calculating means is performed when the feedback control is switched from the variable geometry control to the exhaust bypass valve control after said overboost control is performed.

8. The apparatus of claim 2, including means for switching feedback correction between said variable geometry control and said exhaust bypass valve control based on said selection by said operating range discriminating means, wherein said first controlled variable for said variable geometry means is gradually decreased by said first feedback correction means such that said cross section of said inlet is increased by said variable geometry means after the feedback correction is changed from the variable geometry control to the exhaust bypass valve control.

9. A method, comprising:
   driving an exhaust turbine by providing exhaust from an operating system to an inlet of said exhaust turbine,
   driving a compressor with said exhaust turbine to produce a supercharge pressure for said operating system,
   providing a variable geometry means for adjusting the cross section of said inlet to said exhaust turbine,
   providing an exhaust bypass valve means for bypassing said exhaust turbine,
   detecting operating conditions of said operating system,
   detecting said supercharging pressure,
   calculating a deviation between the detected supercharging pressure and a target supercharging pressure,
   calculating a controlled variable for at least one of said variable geometry means and said exhaust bypass valve means based on said operating conditions,
   feedback control correcting said controlled variable in accordance with said deviation and a previously determined learning amount to provide a corrected controlled variable,
   controlling at least one of said variable geometry means and said exhaust bypass valve means in accordance with said corrected controlled variable,
   determining an operating range in which feedback control of at least one of said variable geometry means and said exhaust bypass valve means is to be carried out,
   calculating an integrated value of said deviation, and
   calculating a new learning amount in relation to at least one of said variable geometry means and said exhaust bypass valve means in accordance with the result of the operating range determination and said integrated value of said deviation to correct the controlled variable in the future on the basis of said new learning amount used as said previously determined learning amount.

10. The method of claim 9, including the step of switching between feedback correction of said variable geometry means and said exhaust bypass valve means based on said selection and wherein said calculation of said new learning amounts is performed when the feedback control is switched from the variable geometry control to the exhaust bypass valve control.

11. The method of claim 9, including the step of switching between feedback control of said variable geometry means and said exhaust bypass valve means based on said selection and wherein said calculation of said new learning amounts is performed when a predetermined time has elapsed after switching the feedback control from the variable geometry control to the exhaust bypass valve control.

12. The method of claim 9, further comprising the steps of switching between feedback control of said variable geometry means and said exhaust bypass valve means based on said selection, detection sudden acceleration and providing an overboost control by raising said target supercharging pressure during a predetermined time when sudden acceleration is detected, wherein said calculation of said new learning amounts is performed at a time when switching the feedback control from the variable geometry control to the exhaust bypass valve control after said overboost control is performed.

13. A method, comprising:
   driving an exhaust turbine with exhaust from an operating system by supplying said exhaust to an inlet of said exhaust turbine,
   driving a compressor with said exhaust turbine for producing a supercharging pressure,
   providing a variable geometry means for adjusting a cross section of said inlet to said exhaust turbine,
   providing an exhaust bypass valve means bypassing said exhaust turbine,
   detecting operating conditions of said operating system,
   detecting said supercharging pressure,
   calculating a deviation between the detected supercharging pressure and a target supercharging pressure,
   integrating said deviation,
   calculating first and second controlled variables for actuating, respectively, said variable geometry means and said exhaust bypass valve means in accordance with said operating conditions,
   feedback correcting said first and second controlled variables in accordance with said integrated value of said deviation and a previously determined learning amount to provide first and second corrected controlled variables, controlling said variable geometry means and exhaust bypass valve means in accordance with said first and second corrected controlled variables, determining an operating range in which to perform feedback control of said variable geometry means and said exhaust bypass valve means, and selecting whether to perform feedback control of said variable geometry means or exhaust bypass valve means, calculating new learning amounts in relation to said variable geometry means and exhaust bypass valve means in accordance with the result of said operating range determination and said integrated value of said deviation, so that said first and second controlled variables are corrected in the future based on said new learning amounts used as said previously determined learning amounts, and adjusting the timing of said calculation of said first and second new learning amounts to effectively operate said variable geometry means and exhaust bypass valve means.

14. The method of claim 13, wherein said new learning amounts related to said variable geometry means and exhaust bypass valve means are recalculated each time that said supercharging pressure becomes less than a predetermined supercharging pressure.

* * * * *